United States Patent
Park et al.

(10) Patent No.: US 10,088,986 B2
(45) Date of Patent: Oct. 2, 2018

(54) USER FUNCTION OPERATION METHOD AND ELECTRONIC DEVICE SUPPORTING THE SAME

(71) Applicant: Samsung Electronics Co., Ltd., Suwon-si, Gyeonggi-do (KR)

(72) Inventors: Sungjae Park, Suwon-si (KR); Youngjoo Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 14/081,152

(22) Filed: Nov. 15, 2013

(65) Prior Publication Data

US 2014/0137005 A1    May 15, 2014

Related U.S. Application Data

(60) Provisional application No. 61/726,711, filed on Nov. 15, 2012.

(30) Foreign Application Priority Data

Feb. 22, 2013 (KR) .................. 10-2013-0019441

(51) Int. Cl.
  *G06F 9/48* (2006.01)
  *G06F 3/0484* (2013.01)
  *G06F 9/445* (2018.01)

(52) U.S. Cl.
  CPC ...... *G06F 3/04842* (2013.01); *G06F 9/44526* (2013.01); *G06F 9/485* (2013.01)

(58) Field of Classification Search
  None
  See application file for complete search history.

(56) References Cited

U.S. PATENT DOCUMENTS

| | | | |
|---|---|---|---|
| 6,735,770 B1 | 5/2004 | Yeager et al. | |
| 7,908,176 B1* | 3/2011 | Hill | ............ 705/26.64 |
| 8,429,674 B2* | 4/2013 | Maeckel | ........ G06F 9/485 |
| | | | 455/556.2 |
| 2005/0149529 A1 | 7/2005 | Gutmans | |
| 2005/0222918 A1* | 10/2005 | Vanska et al. | ........ 705/26 |

(Continued)

FOREIGN PATENT DOCUMENTS

| | | |
|---|---|---|
| JP | 2001-034449 A | 2/2001 |
| KR | 10-0747663 B1 | 8/2007 |
| WO | 2004-040923 A1 | 5/2004 |

OTHER PUBLICATIONS

Apple, "IOS App programming guide", 2012.*

(Continued)

*Primary Examiner* — Jennifer N To
*Assistant Examiner* — Beau D Spratt
(74) *Attorney, Agent, or Firm* — Jefferson IP Law, LLP

(57) ABSTRACT

A user function operation method and an electronic device supporting the same are provided. The user function operation method includes executing a user function according to at least one of a selection event and a preset execution cycle by loading program data realizing the user function on a memory and starting a timer, outputting information collected during execution of the user function, and removing, upon expiration of the timer, the program data from the memory while sustaining information output by the user function.

12 Claims, 26 Drawing Sheets

(56) References Cited

U.S. PATENT DOCUMENTS

| | | | |
|---|---|---|---|
| 2006/0004951 A1* | 1/2006 | Rudelic et al. | 711/103 |
| 2007/0094651 A1* | 4/2007 | Stephens | H04L 67/1008 |
| | | | 717/151 |
| 2007/0156913 A1* | 7/2007 | Miyamoto et al. | 709/230 |
| 2009/0113444 A1* | 4/2009 | Hackborn | G06F 9/461 |
| | | | 719/312 |
| 2009/0187916 A1* | 7/2009 | Liu | G06F 9/461 |
| | | | 718/108 |
| 2010/0211898 A1 | 8/2010 | Bhojani et al. | |
| 2010/0250718 A1* | 9/2010 | Igarashi | H04L 45/00 |
| | | | 709/221 |
| 2012/0023200 A1 | 1/2012 | Johnson et al. | |
| 2012/0167117 A1* | 6/2012 | Kekeh | G06F 9/485 |
| | | | 719/318 |
| 2013/0332846 A1* | 12/2013 | Freedman | H01B 7/292 |
| | | | 715/745 |

OTHER PUBLICATIONS

Anonymous : Processes and Threads , Android Developers, retrieved from the internet, Sep. 18, 2012.

"Android Internals", XP055115997, Retrieved from the internet, Apr. 13, 2011.

Anonymous, "fork(2): create child process—Linux man page", Feb. 11, 2012, Retrieved from the Internet: URL: https://web.archive.org/web/20120211072544/https://linux.die.net/man/2/fork.

* cited by examiner

FIG. 15

```
Send request SLAVE LIST
-------------------------------------[Slave List]-------------------------------------
 pid    slave name                    package name                    abi  refcnt  fault  state      inst  pkg  ttl
 2857   0_1325405971.388352           com.samsung.data-provider-slave  C    2       0      Resumed    11    1    0.0000
 3602   0_1325406121.994845           com.samsung.data-provider-slave  C    2       0      Resumed    1     1    21.6942
slave_list Send request SLAVE LIST
-------------------------------------[Slave List]-------------------------------------
 pid    slave name                    package name                    abi  refcnt  fault  state      inst  pkg  ttl
 2857   0_1325405971.388352           com.samsung.data-provider-slave  C    2       0      Resumed    11    1    0.0000
 3602   0_1325406121.994845           com.samsung.data-provider-slave  C    2       0      Resumed    1     1    7.7181
slave_list Send request SLAVE LIST
-------------------------------------[Slave List]-------------------------------------
 pid    slave name                    package name                    abi  refcnt  fault  state      inst  pkg  ttl
 2857   0_1325405971.388352           com.samsung.data-provider-slave  C    2       0      Resumed    11    1    0.0000
 3602   0_1325406121.994845           com.samsung.data-provider-slave  C    2       0      Resumed    1     1    0.9498
slave_list Send request SLAVE LIST
-------------------------------------[Slave List]-------------------------------------
 pid    slave name                    package name                    abi  refcnt  fault  state       inst  pkg  ttl
 2857   0_1325405971.388352           com.samsung.data-provider-slave  C    2       0      Resumed     11    1    0.0000
 -1     0_1325406121.994845           com.samsung.data-provider-slave  C    1       0      Terminated  1     1    0.0000
```

FIG. 16D
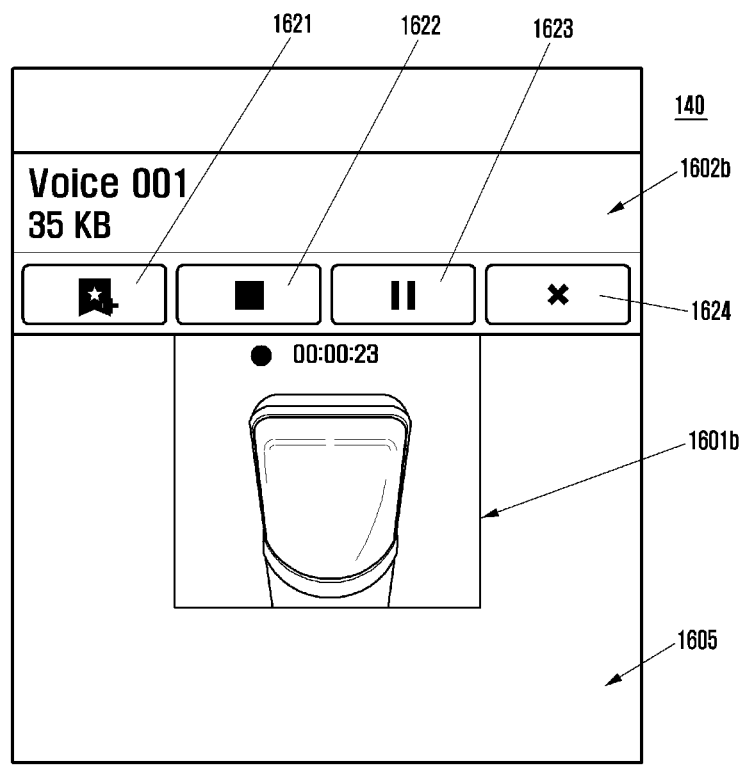
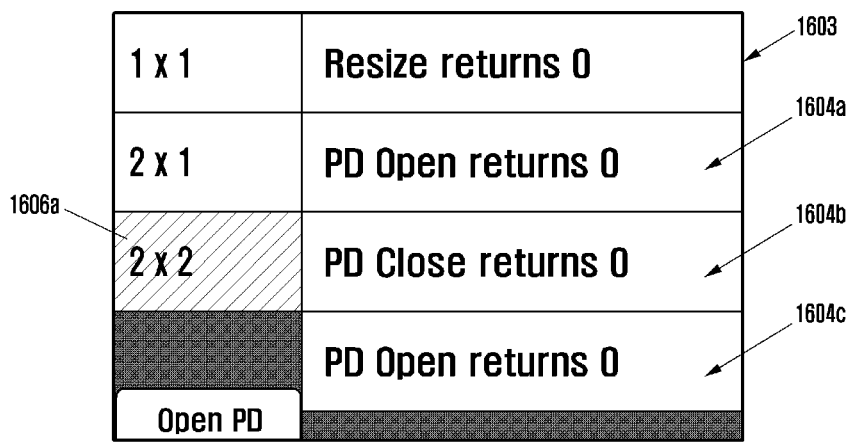

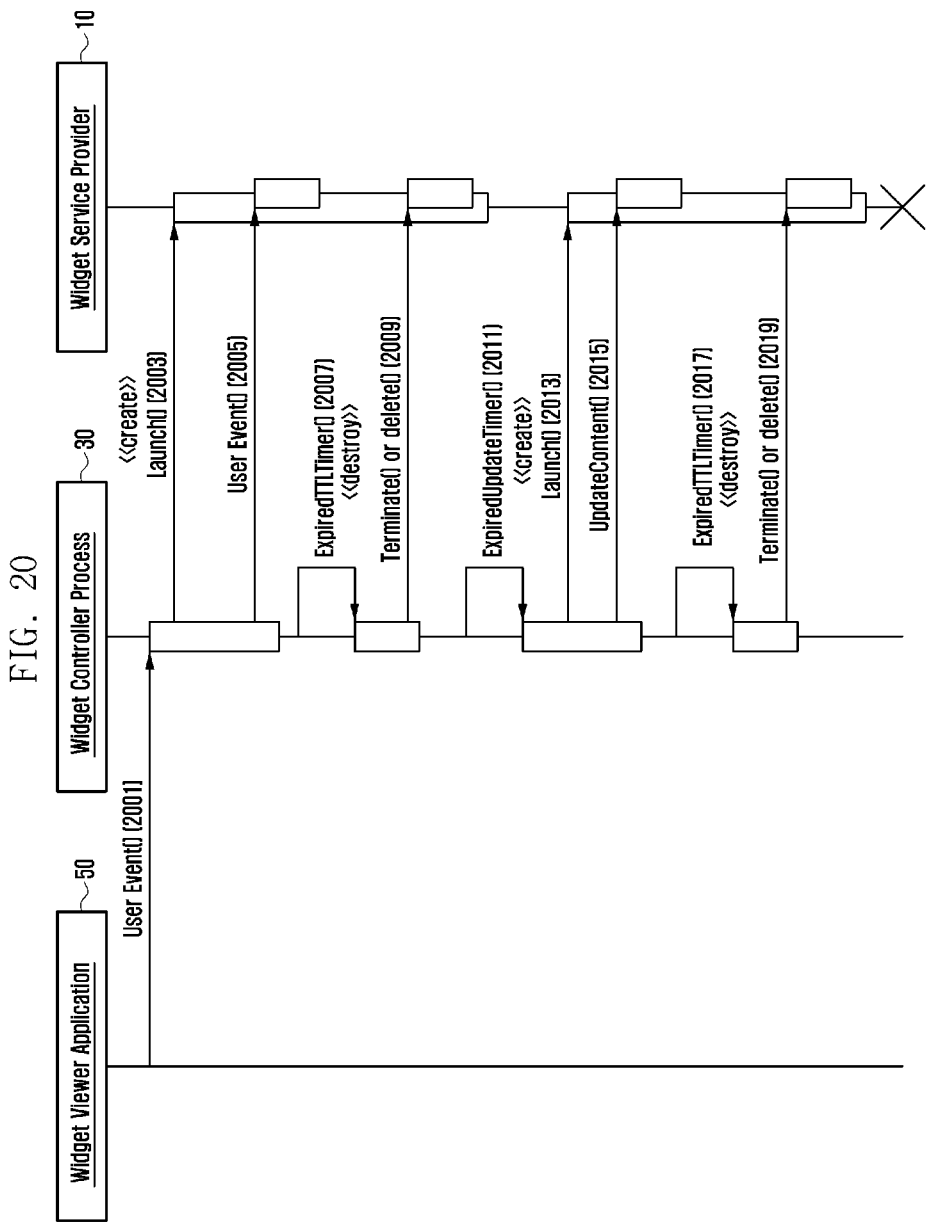

USER FUNCTION OPERATION METHOD AND ELECTRONIC DEVICE SUPPORTING THE SAME

PRIORITY

This application claims the benefit under 35 U.S.C. § 119(e) of a U.S. provisional patent application filed on Nov. 15, 2012 in the U.S. Patent and Trademark Office and assigned Ser. No. 61/726,711, and under 35 U.S.C. § 119(a) of a Korean patent application filed on Feb. 22, 2013 in the Korean Intellectual Property Office and assigned Serial No. 10-2013-0019441, the entire disclosure of each of which is hereby incorporated by reference.

BACKGROUND OF THE INVENTION

1. Field of the Invention:

The present invention relates to management of user functions. More particularly, the present invention relates to a method that enables an electronic device to effectively perform user functions.

2. Description of the Related Art:

Recently, various types of mobile devices supporting various user functions have been developed. To accommodate diversified user functions, such a mobile device has to support user functions in an efficient way.

Therefore, a need exists for a user function operation method that enables efficient execution of user functions, and an electronic device supporting the method.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a user function operation method that enables efficient execution of user functions, and an electronic device supporting the method.

In accordance with an aspect of the present invention, an electronic device supporting a user function operation is provided. The electronic device includes, as execution modules, a widget viewer application for at least one of receiving an input event indicating arrival of an execution cycle of a widget and requesting execution of the widget, a widget service provider for loading a process and for loading the widget on the process to execute the widget, and a widget controller process residing between the widget service provider and the widget viewer application for controlling widget execution and widget related information output.

In accordance with another aspect of the present invention, an electronic device supporting a user function operation is provided. The electronic device supporting user function operation includes a first memory for loading program data that realizes a user function to be executed according to at least one of a selection event and a preset execution cycle, a timer started when the program data is loaded, a display unit for outputting information collected during execution of the user function, a second memory for storing information to be output on the display unit, and a control unit for controlling an operation to remove, upon expiration of the timer, the program data from the first memory while sustaining information output by the user function.

In accordance with another aspect of the present invention, a user function operation method for an electronic device is provided. The user function operation method includes executing a user function according to at least one of a selection event and a preset execution cycle by loading program data realizing the user function on a memory and starting a timer, outputting information collected during execution of the user function, and removing, upon expiration of the timer, the program data from the memory while sustaining information output by the user function.

In a feature of the present invention, the user function operation method enables an electronic device to execute user functions under low power conditions.

In addition, the user function operation method enables an electronic device to efficiently execute user functions with reduced load.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description in conjunction with the accompanying drawings, in which:

FIG. 15 illustrates a result of monitoring process behaviors in a user function operation according to an exemplary embodiment of the present invention;

FIGS. 16A through 16E are screen representations depicting widget execution in a user function operation according to an exemplary embodiment of the present invention;

FIGS. 18 through 20 are sequence diagrams illustrating a process and a widget lifecycle management in a user function operation according to an exemplary embodiment of the present invention.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
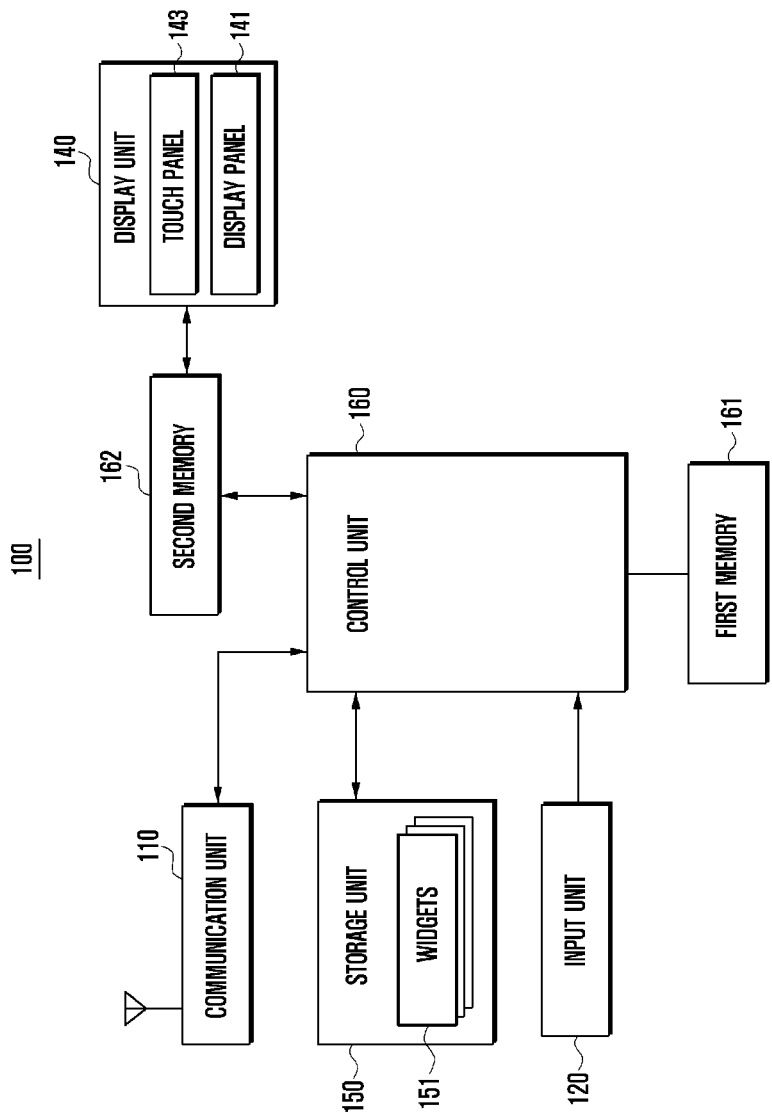
FIG. 1 is a block diagram of an electronic device supporting a user function operation according to an exemplary embodiment of the present invention.

FIG. 1 is a block diagram of an electronic device supporting a user function operation according to an exemplary embodiment of the present invention.

Referring to FIG. 1, the electronic device supporting a user function operation (referred to as a terminal device 100) may include a communication unit 110, an input unit 120, a control unit 160, a display unit 140, and a storage unit 150. The terminal device 100 may further include a first memory 161 and a second memory 162 for operation of the control unit 160. Here, the first memory 161 and the second memory 162 may be configured as parts of the storage unit 150, or may be configured respectively as parts of the storage unit 150 and the control unit 160. For example, the first memory 161 may act as a display buffer for the display unit 140 and the second memory 162 may act as a Random Access Memory (RAM) of the control unit 160 for user function operation. The first memory 161 and the second memory 162 may include volatile or nonvolatile memory devices, preferably, nonvolatile memory devices, such as a flash memory. However, the present invention is not limited by types or classes of memory devices.

In the description, program data or application program routines for user function operation are described as "widgets". In an exemplary embodiment of the present invention, a "widget" may include a routine that is uploaded on the first memory 161 periodically or upon a user request to perform information update by collecting information on the terminal device 100 or on the outside according to preset package information. In other words, a widget may be at least one application program routine that is loaded on the first memory 161 according to control of the control unit 160 or a user request (not continuously loaded on the first memory 161) to support information collection and output. In the first memory 161, an application program routine may be associated with specific data.

In an exemplary embodiment of the present invention, the terminal device 100 is designed to support on-demand loading of a widget on the first memory 161 and execution thereof. In addition to widgets developed according to an exemplary embodiment of the present invention, the storage unit 150 of the terminal device 100 may store widgets developed according to related art techniques, which are continuously loaded on the first memory 161. In the following description, an application program routine that is loaded on the first memory 161 on an on-demand basis to collect and output information is referred to as a "widget".

The communication unit 110 is configured to support communication for the terminal device 100. The communication unit 110 establishes a communication channel to an external device when a user function supported by the terminal device 100 requires a communication connection. The communication unit 110 may support various types or schemes of communication. For example, when the terminal device 100 supports mobile communication, the communication unit 110 may include a communication module supporting one or more mobile communication schemes. When the terminal device 100 supports short-range wireless communication, the communication unit 110 may include a communication module supporting one or more short-range wireless communication schemes. More particularly, the communication unit 110 may operate according to a communication request made by execution of a widget 151 stored in the storage unit 150. For example, when a widget 151 stored in the storage unit 150 is activated and issues a request for information collected at a given location of a specific website, the communication unit 110 may establish a communication channel to the website, receive information collected at the location, and forward the received information to the control unit 160. Additionally, upon activation of a given widget 151, the communication unit 110 may activate a short-range wireless communication module to scan external devices in the vicinity thereof, establish a communication channel to a found external device according to scheduling information of the widget 151, and send information provided by the control unit 160 to the external device or forward information received from the external device to the control unit 160.

The input unit 120 is configured to generate various input signals used for operation of the terminal device 100. The input unit 120 may include a home key, a side key, a keypad, and the like. When the display unit 140 supports a touch-screen capability, the input unit 120 may be realized using a touch panel. The input unit 120 may also be realized using a stylus pen or electromagnetic induction pen and a panel supporting this. The input unit 120 may generate an input signal for turning on or off the terminal device 100, an input signal for adding a widget 151 to an execution list, an input signal for suspending a widget 151 on the execution list, and an input signal for installing or uninstalling a widget 151.

The display unit 140 may display various screens for operation of the terminal device 100. For example, the display unit 140 may output an idle screen and a menu screen. More particularly, the display unit 140 may output a widget screen within which at least one widget is embedded. A menu icon or the like may be added to the widget screen on the display unit 140. The widget screen embedding a widget includes an output region corresponding to the widget. Information collected by the widget is output in the corresponding output region. For example, when a weather widget is executed, weather information collected by the weather widget may be output in the corresponding output region of the widget screen. This collected weather information is written at a portion of the second memory 162 before output to the output region. When a stock widget is executed, stock information collected by the widget may be output in the corresponding output region of the widget screen. This collected stock information is written at a portion of the second memory 162 before output to the output region. The display unit 140 may compose screen data using information items written in the second memory 162. Information written in the second memory 162 may be maintained until an event for stopping the corresponding widget occurs. In other words, when a widget is registered in the execution list, information related to the widget can be written and maintained in the second memory 162 regardless of whether the widget is loaded or not loaded on the first memory 161. The display unit 140 may support touch capability to generate an event for executing a function of a widget. To this end, the display unit 140 may include a touch panel 143 and a display panel 141. Operations related to the display unit 140 are described below with reference to the accompanying screen representations.

The storage unit 150 is configured to store various information used for operation of the terminal device 100. For example, the storage unit 150 may store an operating system for operation of the terminal device 100, and various application programs to support user functions thereof. More particularly, the storage unit 150 may store one or more widgets 151 to support user functions.

The widgets 151 may include various application program routines supporting user functions. The widgets 151 may be loaded on the first memory 161 and executed by processors assigned by the control unit 160. The widgets 151 may be designed to support various user functions. For example, a weather widget may be designed to provide real-time weather information. Such a weather widget may include a routine for connecting to a web server providing weather information, and a routine for obtaining weather information for a given date and a local region from the web server. Various types of weather widgets, such as a daily weather widget, a weekly weather widget and a local weather widget, may be designed according to user needs. As another example, a news widget may be designed to provide real-time news information. Multiple news widgets may be designed to deliver single-category news or multi-category news. In the above description, weather widgets and news widgets are described. However, the present invention is not limited thereto. For example, the widgets 151 may include various program routines that can collect information regarding user functions of the terminal device 100 and output the collect information. For example, the widgets 151 may include a widget providing information on public transportation, such as the subway, a widget supporting music playback, a widget supporting numerical computation, a widget supporting memory and process management, and a widget supporting battery management. Other information widgets may also be developed.

In an exemplary embodiment of the present invention, a widget 151 may include an operational routine, which is loaded on the first memory 161 to collect relevant information, and information collected by the operational routine and stored in the second memory 162. The widget related information stored in the second memory 162 is to be output on the display unit 140. When a widget is unloaded from the first memory 161, the state of the widget may be stored together with information collected so for in the storage unit 150. Hence, it is understood that a widget 151 may include a program routine stored in the storage unit 150 and information collected thereby. In the event that a widget has not been executed after installation in the terminal device 100, the widget does not generate or collect any information. In this case, the widget may not include relevant information. Hence, it can be considered that a widget includes an operational routine by default and may further include relevant information if exists. The information related to a widget may include all relevant information collected during execution of the widget or include the most recently collected information only according to widget design.

The first memory 161 may be used by the control unit 160 to support user functions. The first memory 161 may include a RAM, a Read Only Memory (ROM), a flash memory, and the like. The operating system and various application programs realizing user functions may be loaded on the first memory 161. More particularly, application program routines of widgets supporting user functions may be loaded on the first memory 161 under control of the control unit 160. To support execution of widget application routines, one or more processes may be loaded on the first memory 161. Processes may include program data, programming language statements, and APIs. Processes may be created using programming languages, such as JAVA, HyperText Markup Language (HTML), C, C++, and the like. Processes may include platform widget processes.

The second memory 162 may store information to be output on the display unit 140. For example, the second memory 162 may store information on screen elements and information on widgets. Information related to a specific widget may be updated according to scheduling information of the widget or user input. Information related to a widget stored in the second memory 162 may be updated with newly collected information when an event for executing a function of the widget is generated. When the widget related information is updated in the second memory 162, the display unit 140 outputs the updated widget related information under control of the control unit 160. When widget related information is not updated, the display unit 140 maintains output of existing widget related information stored in the second memory 162. The display unit 140 may discontinue output of information related to a widget when execution of the widget ends, when a process executing the widget is terminated, when the widget is uninstalled, or when the terminal device 100 is turned off Upon generation of a certain event terminating execution of a widget, information related to the widget stored in the second memory 162 may be deleted. In the case that the second memory 162 includes a nonvolatile memory, such as a flash memory, widget related information may be sustained in the second memory 162 even when the terminal device 100 is turned off Upon generation of an event for terminating execution of a widget or uninstalling a widget, corresponding widget related information may be deleted from the second memory 162 even when the second memory 162 is nonvolatile.

The terminal device 100 may further include components to support user functions. For example, the terminal device 100 may further include an audio processing unit (including a speaker for outputting an audio signal and a microphone for collecting an audio signal), and a sensor unit (including an image sensor for capturing images and an acceleration or proximity sensor for detecting motion of the terminal device 100).

The control unit 160 controls the internal components of the terminal device 100 and power supply thereto so as to perform signal processing and data processing used for supporting user functions. More particularly, the control unit 160 manages a list of widgets to be executed according to user settings or preset scheduling information. After power-on of the terminal device 100, the control unit 160 checks the widget list to determine a widget to be executed. To this end, the widget list may include property information of registered widgets 151, such as execution cycle or time, type, output format, use of a network or component of the terminal device 100, and the like.

When a widget to be executed is found in the widget list, the control unit 160 controls an operation to load processes needed to execute the widget and load operational routines corresponding to the widget. The control unit 160 executes the loaded operational routines to collect information related to the widget, and controls output of the collected information on the display unit 140 according to the output format of the widget. The control unit 160 may identify the lifecycle of each widget on the widget list and determine the time to load the widget on the first memory 161 based on the lifecycle information. Hence, the control unit 160 may increase usage efficiency of the first memory 161 in support of user functions. A description is given of a hierarchy of program modules in the control unit 160 with reference to FIG. 2.

Figure 2:
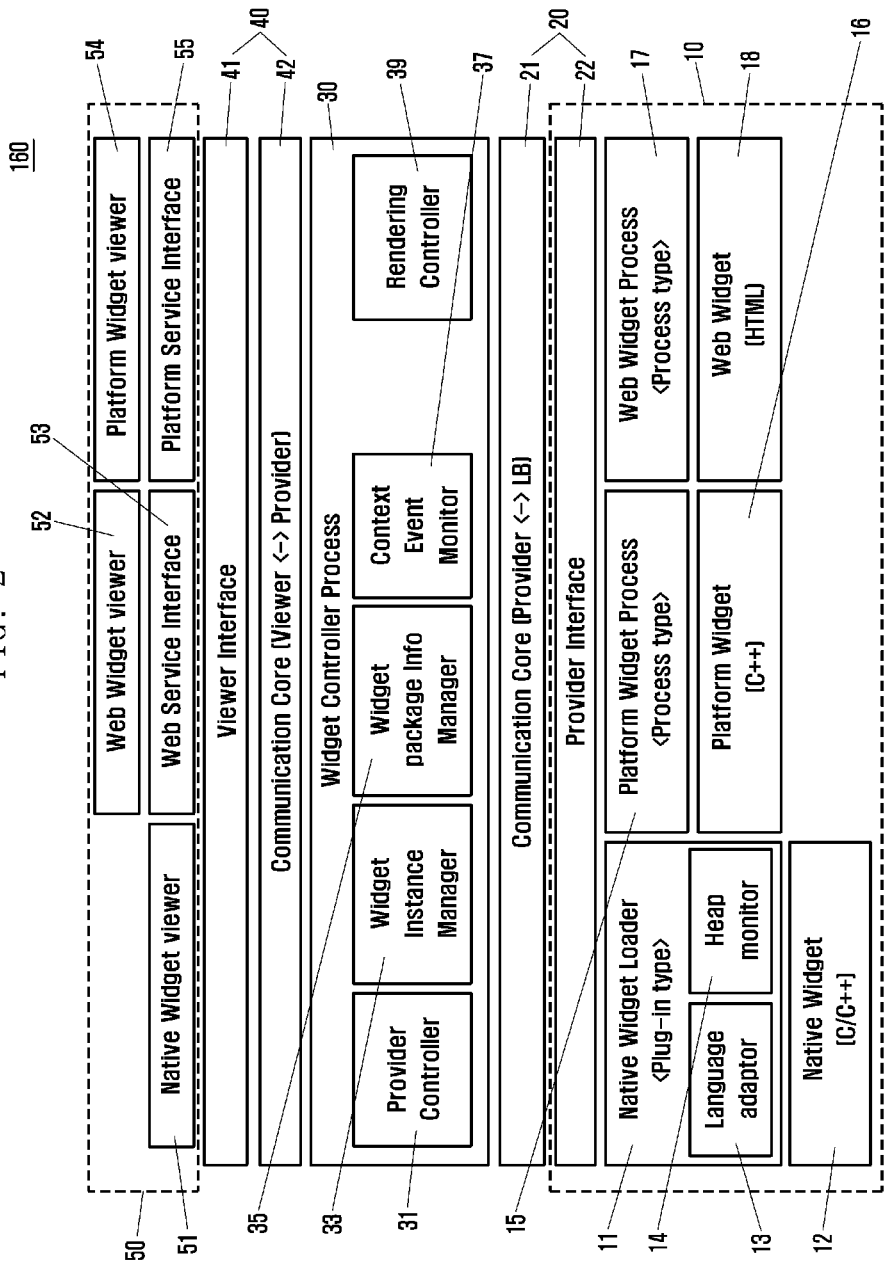
FIG. 2 illustrates a hierarchy of program modules supporting user functions in a control unit of an electronic device according to an exemplary embodiment of the present invention.

FIG. 2 illustrates a hierarchy of program modules supporting user functions in a control unit of an electronic device according to an exemplary embodiment of the present invention.

Referring to FIG. 2, the control unit 160 includes a widget service provider 10, a first communication interface 20, a widget controller process 30, a second communication interface 40, and a widget viewer application 50.

The widget service provider 10 is a layer at which one or more processes and application program routines for widget operation are loaded. A process may load routines corresponding to a widget 151. One or more plug-in type widgets may be loaded on a process, and a process type widget is loaded on a process.

Process type and plug-in type widgets or processes may be written in programming languages. For example, plug-in type widgets and corresponding processes may be written in the C or C++ programming language (i.e., a native widget 12). Process type widgets and corresponding processes may be written in various programming languages. For example, a platform widget process 15 may load a platform widget 16 written in the C++ programming language. A web widget process 17 may load a web widget 18 written in HTML. The terminal device 100 may provide various programming languages, Application Programming Interfaces (APIs) and libraries usable to develop widgets and processes.

To load and execute plug-in type widgets, processes, such as a language adaptor 13 and a heap monitor 14 may be used by a native widget loader 11. The widget service provider 10 may add a process according to the number of plug-in type widgets. For example, in the case that four plug-in type widgets are loaded on a process, when a new plug-in type widget is added for execution, the widget service provider 10 may clone the process loading four plug-in type widgets and loads the new plug-in type widget on the cloned process.

The widget service provider 10 may load one process type widget on a single process.

In response to an execution request for a widget 151 from the widget controller process 30, the widget service provider 10 may invoke a process and load the widget 151 on the process. Here, the invoked process may differ according to the type of the requested widget 151 (i.e., a process type or a plug-in type). Thereafter, the widget service provider 10 executes the widget 151 and collects information related to the widget 151 according to property information of the widget 151. The widget service provider 10 may transfer the collected widget related information to the widget controller process 30 or directly to the widget viewer application 50.

The first communication interface 20 is placed between the widget controller process 30 and the widget service provider 10. The first communication interface 20 is used to transfer a request message or a request packet from the widget controller process 30 to the widget service provider 10, and transfer a request processing result or buffer allocation information from the widget service provider 10 to the widget controller process 30. To this end, the first communication interface 20 includes a provider interface 22 to support the widget service provider 10 and a first communication core 21 to exchange signals with the widget controller process 30.

The widget controller process 30 resides between the widget service provider 10 and the widget viewer application 50. The widget controller process 30 controls loading and execution of widgets according to events provided by the widget service provider 10. The widget controller process 30 may deliver widget related information to the widget service provider 10 executing widgets. The widget controller process 30 controls lifecycles of widgets in execution. The widget controller process 30 may include a provider controller 31, a widget instance manager 33, a widget package information manager 35, a context event monitor 37, and a rendering controller 39.

The provider controller 31 may control the widget service provider 10 to invoke a process loading a widget. The provider controller 31 may control the lifecycle of a process invoked by the widget service provider 10. The provider controller 31 may write process related data in the second memory 162 and remove process related data from the second memory 162. The provider controller 31 may control processing of data written in the second memory 162 and control corresponding processing results. The provider controller 31 may transfer the processing results to the widget instance manager 33, and may receive request messages or packets for controlling the widget service provider 10 from the widget instance manager 33.

The widget instance manager 33 is configured to control execution of widget functions of the widget viewer application 50. For example, the widget instance manager 33 may control execution of functions supported by the widget viewer application 50, such as a widget addition, a widget execution control based on the execution list, a widget related information output, a widget removal from the execution list, a widget function removal, and a widget installation or uninstallation. To perform a widget function, the widget instance manager 33 may request the provider controller 31 to load indicated widgets on a given process, and may control lifecycles of the widgets loaded on the given process.

The widget instance manager 33 may identify property information of a widget via the widget package information manager 35. For example, the widget instance manager 33 may obtain property information of a widget 151, such as execution cycle, lifecycle, and device component to be activated, from the widget package information manager 35, and may control an operation to execute widget functions or remove the widget 151 from the widget service provider 10 based on the property information. This is described below with reference to a widget function execution.

The widget package information manager 35 may identify property information of a widget 151 and provide the property information to the widget instance manager 33. The property information of a widget 151 may include various information elements as described above. The lifecycle of a widget 151 may correspond to a time duration during which the widget 151 is loaded on the widget service provider 10. The lifecycle of a widget 151 may be reset when a function of the widget 151 is executed. For example, when the user selects and executes a function of a widget 151, the lifecycle of the widget 151 may be initialized.

The execution cycle of a widget indicates the cycle for collecting information related to the widget. The execution cycle may be equal to or shorter than the lifecycle. For example, when the lifecycle of a widget is 30 seconds, the execution cycle thereof may be 10 seconds. The execution cycle of a widget may be defined in a composite manner. For example, the execution cycle of a widget may be set to a value only when the widget remains in valid states during the lifecycle. The execution cycle of a widget may be longer than the lifecycle. For example, when the lifecycle of a widget is 30 seconds, the execution cycle thereof may be one hour. In this case, when no event occurs within 30 seconds after starting the widget, the widget is removed from the widget service provider 10. After one hour, the widget may be reloaded on the widget service provider 10 and executed. Widget or process removal is described below with reference to the following drawings.

The context event monitor 37 monitors widget related information to be output to the output region. For example, the context event monitor 37 may store the most recently collected widget related information as context information for a widget. When a widget function is reactivated after termination, the context event monitor 37 may output the most recently stored widget related information to the output region. When there is no recent widget related information, the context event monitor 37 may output default information to the output region.

The rendering controller 39 controls output of widget related information. To this end, the rendering controller 39 may allocate memory buffers for widget related information. The memory buffers may be commonly accessed by the widget viewer application 50 and the widget service provider 10. For example, the widget service provider 10 may write collected widget related information in the memory buffers, and the widget viewer application 50 may read widget related information from the memory buffers and output the same on the display unit 140.

The second communication interface 40 resides between the widget controller process 30 and the widget viewer application 50. The second communication interface 40 includes a viewer interface 41 and a second communication core 42 to communicate with the widget viewer application 50. The second communication interface 40 transfers a request from the widget controller process 30 to the widget viewer application 50, and transfers a request from the widget viewer application 50 to the widget controller process 30.

The widget viewer application 50 is configured to output information produced by execution of various widget functions. For example, when the widget service provider 10 writes widget related information in a buffer allocated by the widget controller process 30, the widget viewer application 50 may read widget related information from the buffer and output the same on the display unit 140. The widget viewer application 50 may directly receive widget related information from the widget service provider 10 and output the same on the display unit 140. The widget viewer application 50 may handle widget related information according to preset property information of a corresponding widget, and the property information may be provided by the widget package information manager 35 of the widget controller process 30. In addition, the widget viewer application 50 detects a user event on a widget function on the execution list and forwards the user event to the widget controller process 30.

The widget viewer application 50 may include a plug-in type widget viewer 51, a web widget viewer 52, and a platform widget viewer 54 in accordance with types of widgets 151. The plug-in type widget viewer 51 handles output of widget related information for a plug-in type widget. The web widget viewer 52 handles output of widget related information for a widget run on the web widget process 17. The widget viewer application 50 may further include a web service interface 53 to support the web widget viewer 52. The platform widget viewer 54 handles output of widget related information for a widget run on the platform widget process 15. The widget viewer application 50 may further include a platform service interface 55 to support the platform widget viewer 54.

Figure 3:
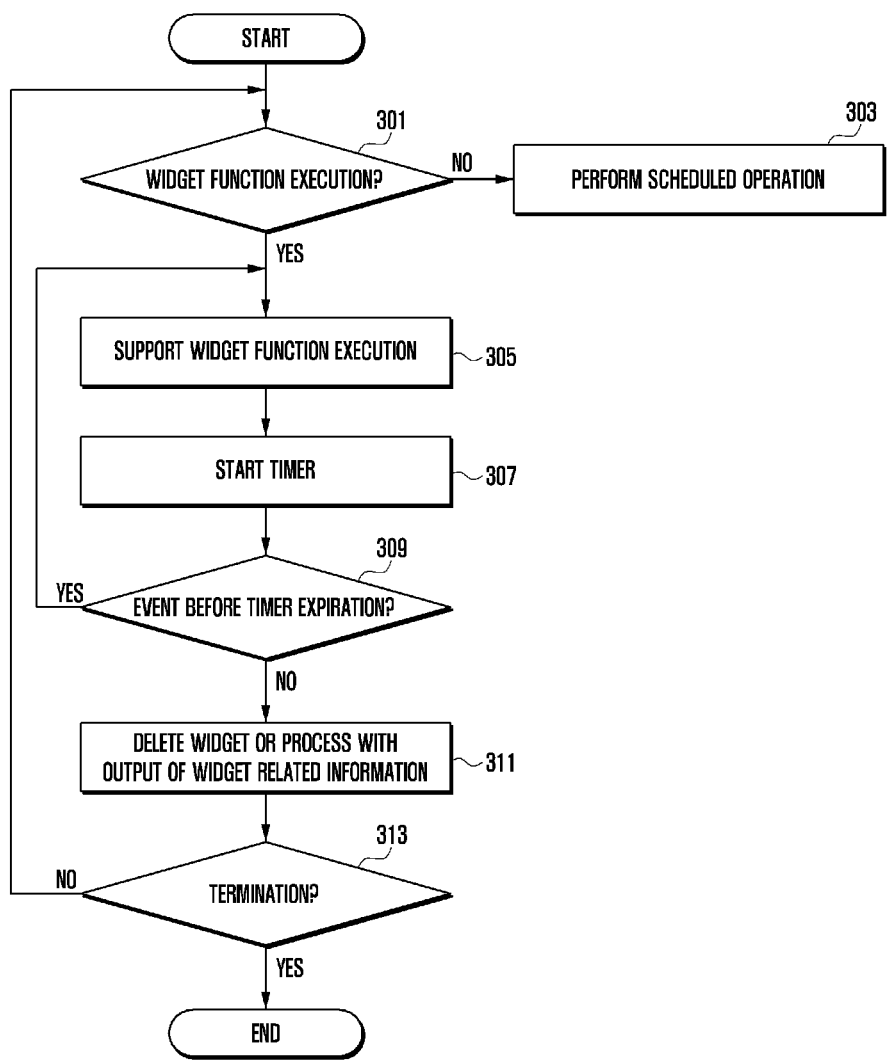
FIG. 3 is a flowchart of a user function operation method according to an exemplary embodiment of the present invention.

FIG. 3 is a flowchart of a user function operation method according to an exemplary embodiment of the present invention.

Referring to FIG. 3, in the user function operation method, the control unit 160 of the terminal device 100 determines whether an event for a widget function execution is received at step 301. Here, an event for the widget function execution may correspond to an invocation of a process supporting a user function to be loaded on the first memory 161 on demand or an invocation of a widget 151 to be loaded on a corresponding process. When an event for the widget function execution is not received, the control unit 160 may perform a requested operation at step 303. For example, the control unit 160 may output an idle screen or a menu screen on the display unit 140, or may execute an application according to preset scheduling information.

When an event for the widget function execution is received, the control unit 160 conducts the widget function execution to collect and output widget related information at step 305. The terminal device 100 may provide an execution list of executable widget functions and the user may generate an event by selecting (touching) a desired entry of the execution list. The user may also generate an event for the widget function execution by touching a portion of the widget output region on the display unit 140.

To support the widget function execution, the control unit 160 may load a requested process on the first memory 161 and load a corresponding widget on the process. When the requested process is already loaded, the control unit 160 may load the corresponding widget on the process. For example, when loading of a plug-in type widget is requested and a process capable of loading a plug-in type widget is already loaded, the control unit 160 may load the requested plug-in type widget on the loaded process. Here, when the process already loads a preset number of plug-in type widgets, the control unit 160 may clone the process and load the requested plug-in type widget on the cloned process. In addition, to support the widget function execution, the control unit 160 may load a viewer on the widget viewer application 50 and output widget related information using the viewer loaded on the widget viewer application 50.

The control unit 160 starts a timer at step 307. To control the widget function execution, the control unit 160 may use a default timer or a timer separately prepared for the present invention. The timer is used to manage the lifecycle of the requested widget. For one widget, one timer may be used to control the lifecycle thereof.

The control unit 160 determines whether an event for the widget function execution is generated before expiration of the timer at step 309. When an event for the widget function execution is generated, the control unit 160 returns to step 305 and continues the widget function execution to collect and output widget related information. The widget function execution may be continued until timer expiration or reception of a termination request for the terminal device 100.

When an event for the widget function execution is not generated before expiration of the timer, the control unit 160 deletes the corresponding widget or process at step 311. The control unit 160 may retain or save corresponding widget related information. Here, the control unit 160 removes routines corresponding to the widget from the first memory 161. In addition, when the widget is the last one loaded on the corresponding process, the control unit 160 may terminate the process in the first memory 161. For example, in a state where a number of plug-in type widgets are loaded in a process, when a timer for one of the loaded plug-in type widgets expires, the control unit 160 may remove only the plug-in type widget whose timer has expired from the process. In spite of widget deletion or process termination, the control unit 160 may retain widget related information produced during execution of the widget by, for example, storing the same in the second memory 162. When a widget termination event is generated, the control unit 160 may remove a corresponding widget from the first memory 161 and remove widget related information of the widget from the second memory 162.

The control unit 160 determines whether a termination request for the terminal device 100 is received at step 313. When a termination request is not received, the control unit 160 returns to step 301 and may repeat the procedure. Here, the termination request may correspond to a transition to a power-saving state, such as a sleep state. For example, when a wake-up event, such as a "Home" or a "Power" key is entered during the sleep state, the control unit 160 may return to step 301 and repeat the procedure.

Figure 4:
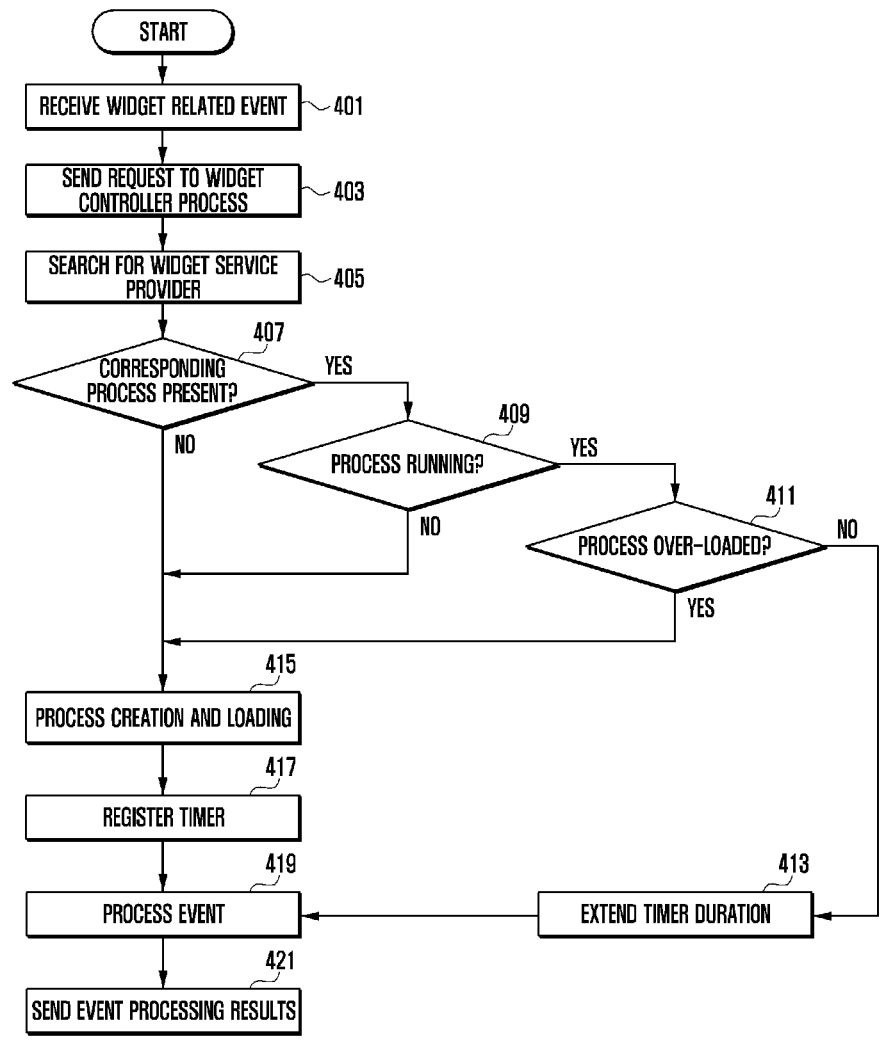
FIG. 4 is a flowchart of a procedure for process management in a user function operation method according to an exemplary embodiment of the present invention.

FIG. 4 is a flowchart of a procedure for process management in a user function operation method according to an exemplary embodiment of the present invention.

Referring to FIG. 4, the widget viewer application 50 receives a widget related event at step 401. The widget viewer application 50 sends a request for a widget function execution to the widget controller process 30 at step 403. The widget controller process 30 searches for the widget service provider 10 supporting the widget function execution at step 405. The widget controller process 30 determines whether a process for the widget function execution is present at step 407. When such a process is present, the widget controller process 30 determines whether the process is running at step 409. When the process is running, the widget controller process 30 determines whether the process is over-loaded owing to a widget to be added at step 411. When the process is not over-loaded owing to a widget to be added, the widget controller process 30 requests the widget service provider 10 to load the corresponding widget on the process and extends a timer expiration duration correspondingly at step 413. In the above description, step 411 may be executed only for a plug-in type widget. For a process type widget, which is loaded alone on a process, when the corresponding process is running at step 409, step 413 of extending timer expiration duration may be directly executed (step 411 is skipped).

When a process for the widget function execution is not present at step 407, is not running at step 409, or is overloaded at step 411, the widget controller process 30 requests the widget service provider 10 to create a process and load the process on the first memory 161 to thereby load the widget at step 415. The widget controller process 30 registers a timer to manage the lifecycle of the new widget at step 417. Thereafter, the widget controller process 30 performs event processing at step 419. Here, step 417 and step 419 may be executed in any order or in parallel. Widget related information is collected according to events during widget execution at step 419. The widget service provider 10 sends event processing results to the widget controller process 30, the widget viewer application 50, or a memory buffer allocated by the widget controller process 30 at step 421.

Figure 5:
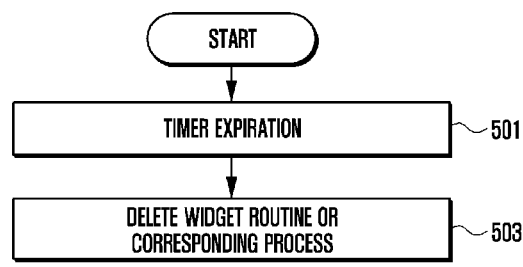
FIG. 5 is a flowchart of a procedure for a process deactivation in a user function operation method according to an exemplary embodiment of the present invention.

FIG. 5 is a flowchart of a procedure for process deactivation in a user function operation method according to an exemplary embodiment of the present invention.

Referring to FIG. 5, the widget controller process 30 receives an event indicating expiration of a timer at step 501. The timer may have been started at the time of initiation of a widget function. The timer may be managed by the widget instance manager 33 of the widget controller process 30.

Upon reception of an event indicating expiration of a timer, the widget controller process 30 removes a widget associated with the timer from the first memory 161 or removes a process loading a widget associated with the timer from the first memory 161 at step 503. To this end, the widget controller process 30 may operate both timers associated with widgets 151 and timers for managing process lifecycles. The same lifecycle may be applied to a process type widget and corresponding process. Different lifecycles may be applied to a plug-in type widget and corresponding process.

While the widget controller process 30 removes a widget or process from the first memory 161, the widget viewer application 50 performs an operation to retain widget related information for the widget being removed.

Figure 6:
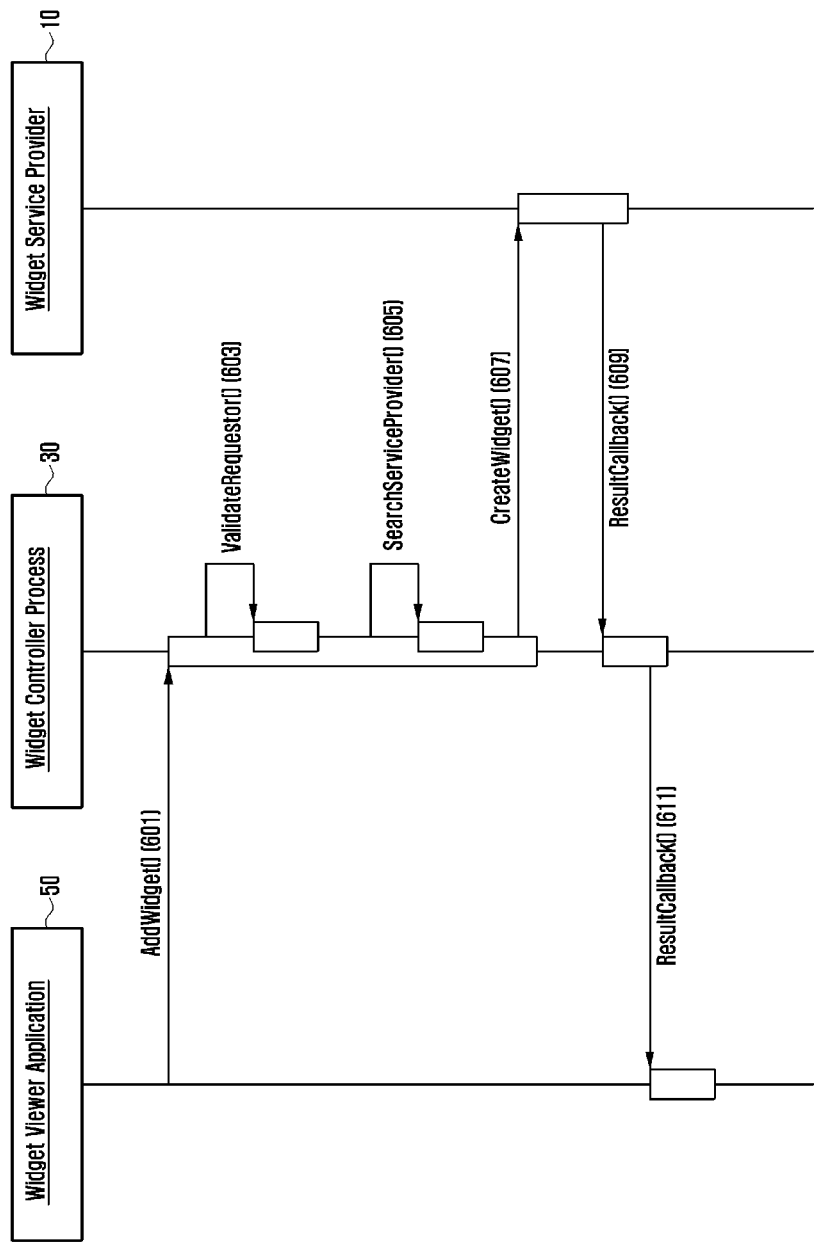
FIG. 6 is a sequence diagram of a procedure for a widget addition in a user function operation method according to an exemplary embodiment of the present invention.

FIG. 6 is a sequence diagram of a procedure for widget addition in a user function operation method according to an exemplary embodiment of the present invention.

Referring to FIG. 6, the widget viewer application 50 may receive an event for a widget function execution through the input unit 120 or the display unit 140. For example, the user may view a list of widget functions not present on the execution list through widget screens, menu screens or other setting screens and select a desired one of the widget function list. Here, widget functions may be represented by icons. Upon reception of an event for the widget function execution, the widget viewer application 50 invokes an AddWidget( ) function (or method) to send a widget addition request to the widget controller process 30 at step 601. The widget controller process 30 determines validity of an AddWidget( ) function at step 603. To this end, the widget controller process 30 may invoke a ValidateRequestor( ) function to examine the widget function list. When an AddWidget( ) function is not a valid request, the widget controller process 30 may ignore the widget addition request (i.e., an AddWidget( ) function) and output a sound notification indicating invalidity of the widget addition request.

When an AddWidget( ) function is a valid request, the widget controller process 30 searches for a widget service provider 10 by performing a SearchServiceProvider( ) function at step 605. The widget controller process 30 invokes a CreateWidget( ) function to send a widget creation request to the found widget service provider 10 at step 607. Upon reception of an invocation of a CreateWidget( ) function, the widget service provider 10 may perform process loading and load a requested widget on the corresponding process. Here, the widget service provider 10 may perform process loading according to the type of the widget. For example, when the requested widget is of plug-in type, the widget service provider 10 may load the widget on an existing process without creating a process.

After widget loading, the widget service provider 10 executes functional routines of the widget to collect widget related information. The widget service provider 10 invokes a ResultCallback( ) function to send widget processing results to the widget controller process 30 at step 609. The widget controller process 30 invokes a ResultCallback( ) function to forward widget processing results to the widget viewer application 50 at step 611. The widget viewer application 50 may extract widget related information from the received widget processing results and output the same on the display unit 140.

Figure 7:
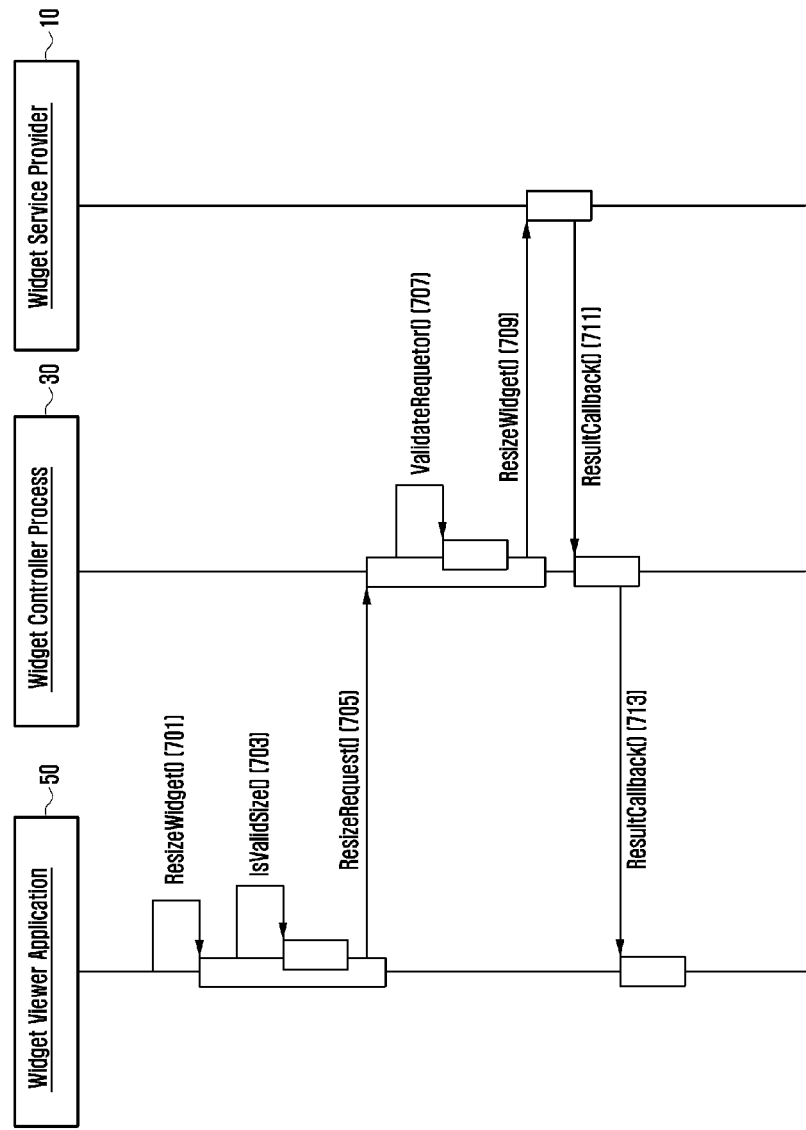
FIG. 7 is a sequence diagram of a procedure for a widget size adjustment in a user function operation method according to an exemplary embodiment of the present invention.

FIG. 7 is a sequence diagram of a procedure for widget size adjustment in a user function operation method according to an exemplary embodiment of the present invention.

Referring to FIG. 7, the widget viewer application 50 may receive an event for widget size adjustment (ResizeWidget( )) through the input means at step 701. Here, the user may select a widget outputting information on the display unit 140 by entering, for example, a long press on the display unit 140, and change the size of the selected widget by, for example, dragging the widget.

Upon reception of an event for widget size adjustment, the widget viewer application 50 invokes an IsValidSize( ) function to determine validity of the widget resize request at step 703. For example, the widget viewer application 50 may determine whether the changed widget size is within a preset allowed size range. When the event is a valid request, the widget viewer application 50 invokes a ResizeRequest( ) function to send a widget resize request to the widget controller process 30 at step 705. When the widget resize request is not valid, the widget viewer application 50 may ignore the request and output an audible, visual or vibration notification indicating invalidity of the request.

Upon reception of a widget resize request from the widget viewer application 50, the widget controller process 30 invokes a ValidateRequestor( ) function to determine the validity of the request at step 707. For example, the widget controller process 30 may determine whether the widget resize request is made for a widget on the execution list. When the widget resize request is not valid, the widget controller process 30 may ignore the request. When the widget resize request is valid, the widget controller process 30 invokes a ResizeWidget( ) function to send a widget nit. widget resize indication, the widget service provider 10 identifies a widget whose size is to be adjusted and executes a resize routine of the widget correspondingly. After widget resizing, the widget service provider 10 invokes a ResultCallback( ) function to send widget size adjustment results to the widget controller process 30 at step 711. The widget controller process 30 invokes a ResultCallback( ) function to forward widget size adjustment results to the widget viewer application 50 at step 713.

In the case that widget display is conducted using a buffer, upon reception of the widget resize request, the widget controller process 30 allocates a memory buffer whose size is fit well for the resized widget and provides address information of the memory buffer to the widget service provider 10. When the widget service provider 10 resizes the identified widget according to the widget resize indication, it writes resized widget image data in the memory buffer and notifies this to the widget controller process 30. The widget controller process 30 notifies the widget viewer application 50 of address information of the memory buffer and widget resize completion. The widget viewer application 50 reads resized widget image data from the memory buffer and outputs the same on the display unit 140. When widget display is conducted using an image file or text, the widget service provider 10 may directly provide widget data to the widget viewer application 50, which then outputs the widget data on the display unit 140, without involvement of the widget controller process 30. This is described below with reference to the drawings.

Figure 8:
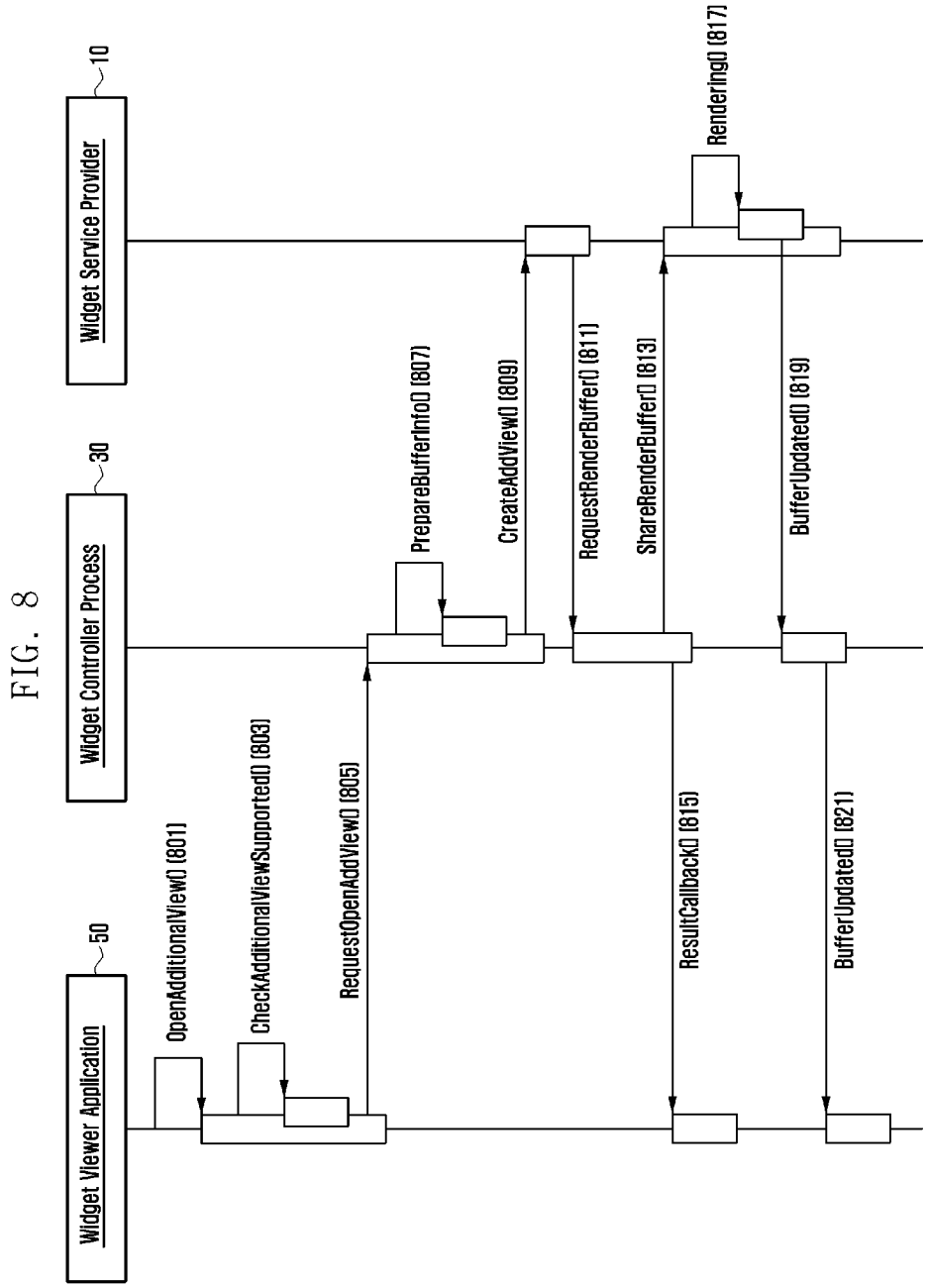
FIG. 8 is a sequence diagram of a procedure for a widget view addition in a user function operation method according to an exemplary embodiment of the present invention.

FIG. 8 is a sequence diagram of a procedure for widget view addition in a user function operation method according to an exemplary embodiment of the present invention.

Referring to FIG. 8, the widget viewer application 50 may receive an input event for widget view addition generated by an OpenAdditionalView( ) function at step 801. Here, a menu item, shortcut key or touch gesture may be used to generate an event for widget view addition in the terminal device 100. Upon reception of an event for widget view addition, the widget viewer application 50 determines possibility of widget view addition by invoking a CheckAdditionalViewSupported( ) at step 803. When possible, the widget viewer application 50 invokes a RequestOpenAddView( ) function to send a request for widget view addition to the widget controller process 30 at step 805.

Upon reception of a request for widget view addition, the widget controller process 30 obtains buffer information by invoking a PrepareBufferInfo( ) function at step 807. For example, the widget controller process 30 may obtain property information of the corresponding widget from the widget package information manager 35 and identify buffer information used for an additional view. Thereafter, the widget controller process 30 invokes a CreateAddView( ) function to send a request for widget view creation to the widget service provider 10 at step 809.

Upon reception of a request for widget view creation from the widget controller process 30, the widget service provider 10 identifies functional routines for widget view creation and prepares for additional widget view rendering. Thereafter, the widget service provider 10 invokes a RequestRenderBuffer( ) function to send a request for buffer information to the widget controller process 30 at step 811. The widget controller process 30 sends buffer information to the widget service provider 10 at step 813. The widget controller process 30 invokes a ResultCallback( ) function to forward widget size adjustment results to the widget viewer application 50 at step 815. The widget service provider 10 renders additional widget view data based on obtained buffer information by invoking a Rendering( ) function at step 817.

After rendering widget view data, the widget service provider 10 invokes a BufferUpdated( ) function to send a buffer update notification to the widget controller process 30 at step 819. The widget controller process 30 invokes a BufferUpdated( ) function to forward a buffer update notification to the widget viewer application 50 at step 821. Upon reception of an invocation of a BufferUpdated( ) function, the widget viewer application 50 may identify buffer address information from the message, read widget view data from the buffer, and output the same on the display unit 140.

Figure 9:
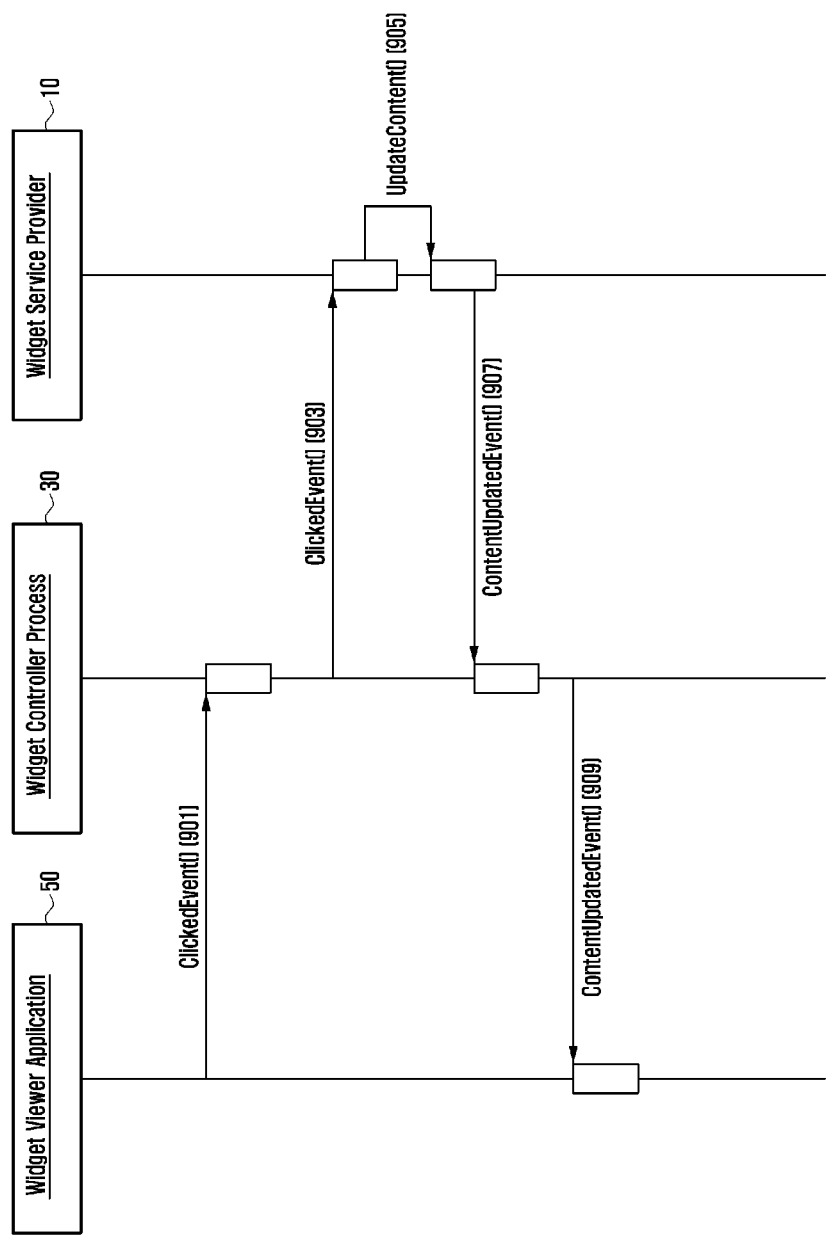
FIG. 9 is a sequence diagram of a procedure for data display using an image file in a user function operation method according to an exemplary embodiment of the present invention.

FIG. 9 is a sequence diagram of a procedure for data display using an image file in a user function operation method according to an exemplary embodiment of the present invention.

Referring to FIG. 9, the widget viewer application 50 may receive an input event generated by clicking the widget output region of the display unit 140. Upon reception of a click event, the widget viewer application 50 invokes a ClickedEvent( ) function to send a click event to the widget controller process 30 at step 901. Here, the widget viewer application 50 may provide information on the clicked widget and coordinates thereof to the widget controller process 30.

The widget controller process 30 invokes a ClickedEvent( ) function to forward the click event to the widget service provider 10 at step 903. Here, the widget controller process 30 may apply the click event to a corresponding process or widget according to the type of the clicked widget. Upon reception of an invocation of a ClickedEvent( ) function from the widget controller process 30, the widget service provider 10 performs widget execution by invoking an UpdateContent( ) function to collect widget related information from the terminal device 100 or an external network at step 905. The widget service provider 10 may produce a visual effect corresponding to the click on the widget output region. The widget service provider 10 creates an image file reflecting the collected information and visual effect (that is, an image file to update the widget output region). The widget service provider 10 may store the image file in a memory buffer of a nonvolatile or volatile memory.

After creation of the image file, the widget service provider 10 invokes a ContentUpdatedEvent( ) function to send a notification for information collection and file creation to the widget controller process 30 at step 907. The widget controller process 30 invokes a ContentUpdatedEvent( ) function to forward an information update event to the widget viewer application 50 at step 909. Upon reception of an information update event, the widget viewer application 50 may read the image file created by the widget service provider 10 and output the same on the display unit 140.

Figure 10:
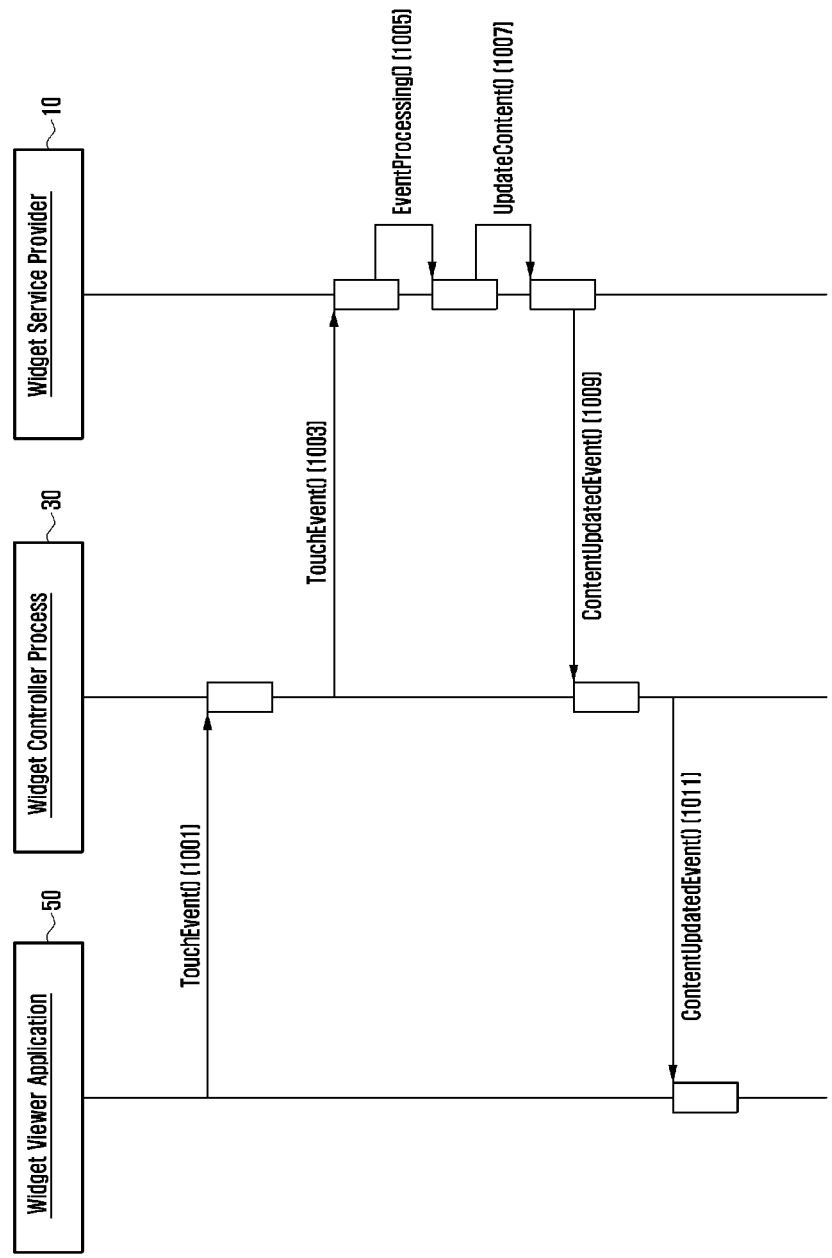
FIG. 10 is a sequence diagram of a procedure for a buffer-based display in a user function operation method according to an exemplary embodiment of the present invention.

FIG. 10 is a sequence diagram of a procedure for buffer-based display in a user function operation method according to an exemplary embodiment of the present invention.

Referring to FIG. 10, the user may touch the widget output region of the display unit 140. Thereafter, the widget viewer application 50 invokes a TouchEvent( ) function to send a touch event to the widget controller process 30 at step 1001. Here, invocation of a TouchEvent( ) function may include touch information regarding touch point, touch down, drag, and touch release on the widget output region.

Upon reception of an invocation of a TouchEvent( ) function from the widget viewer application 50, the widget controller process 30 invokes a TouchEvent( ) function to forward the touch event to the widget service provider 10 at step 1003. Here, invocation of a TouchEvent( ) function may include touch information, such as the type of the touched widget and touch path information describing touch down, movement and release on the widget output region.

Upon reception of an invocation of a TouchEvent( ) function from the widget controller process 30, the widget service provider 10 performs event processing correspondingly by invoking an EventProcessing( ) function at step 1005. For example, the widget service provider 10 may produce a visual effect, such as highlighting or image reversal, on the widget output region. In addition, the widget service provider 10 collects widget related information according to the widget function execution at step 1007.

Thereafter, the widget service provider 10 may obtain a memory buffer and write event processing data and visual effect data in the memory buffer. After data writing, the widget service provider 10 invokes a ContentUpdatedEvent( ) function to send a content update notification (including memory buffer address information) to the widget controller process 30 at step 1009.

The widget controller process 30 invokes a ContentUpdatedEvent( ) function to forward a content update event to the widget viewer application 50 at step 1011. The widget viewer application 50 may identify the widget output region to be updated and memory buffer address information based on the received message, and read data from the memory buffer and output the same on the widget output region.

Figure 11:
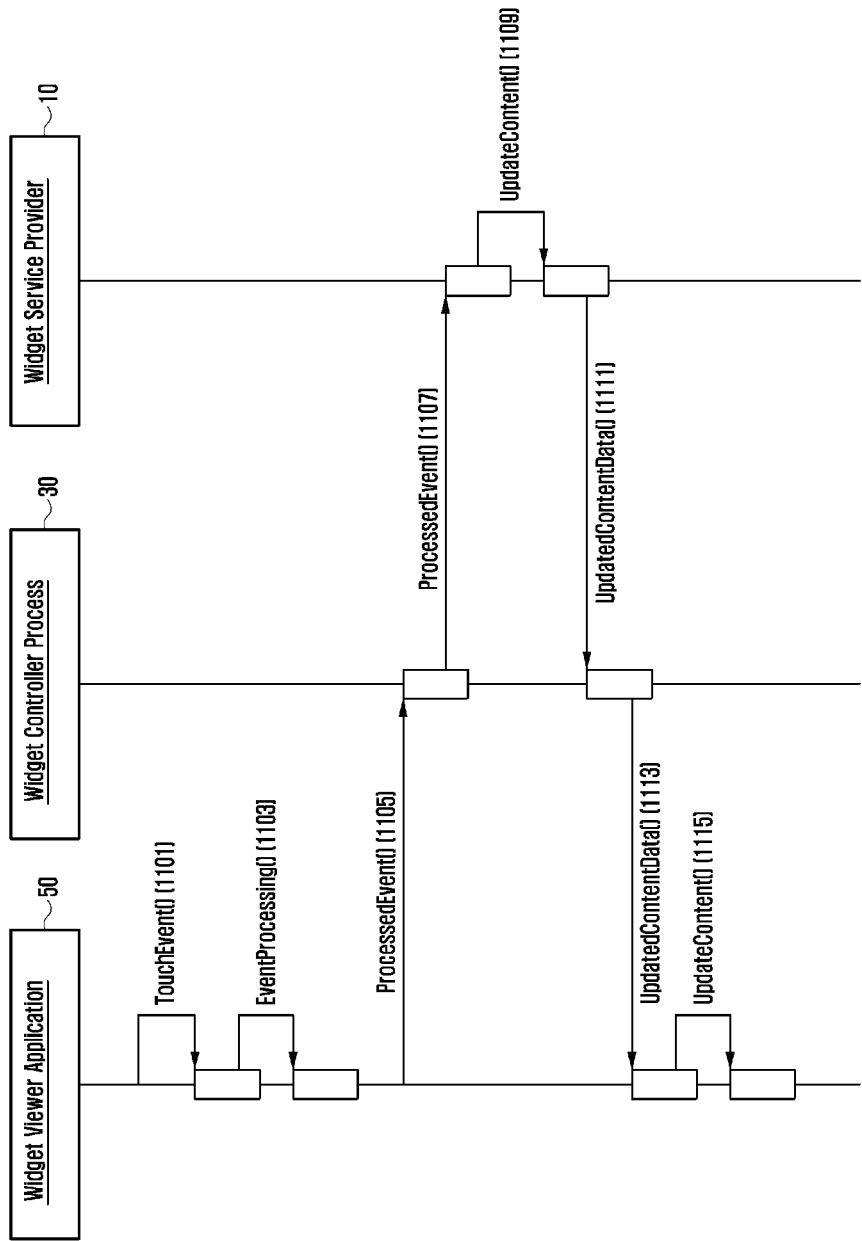
FIG. 11 is a sequence diagram of a procedure for a text-based display in a user function operation method according to an exemplary embodiment of the present invention.

FIG. 11 is a sequence diagram of a procedure for a text-based display in a user function operation method according to an exemplary embodiment of the present invention.

Referring to FIG. 11, when the user touches the widget output region of the display unit 140, the widget viewer application 50 may invoke a TouchEvent( ) function correspondingly at step 1101. The widget viewer application 50 may perform event processing by invoking an EventProcessing( ) function at step 1103. For example, the widget viewer application 50 may produce a visual effect, such as a highlighting, an image reversal, a shading on the widget output region corresponding to the touch event, or the like. To this end, the widget viewer application 50 may be designed to include image processing routines and rendering routines for producing visual effects corresponding to touch events.

The widget viewer application 50 invokes a ProcessedEvent( ) function to send a processed event to the widget controller process 30 at step 1105. The widget controller process 30 invokes a ProcessedEvent( ) function to forward the processed event to the widget service provider 10 at step 1107. Here, the widget controller process 30 may identify a widget corresponding to the processed event and identify a process according to the type of the widget, and provide the processed event to the widget and process.

Upon reception of an invocation of a ProcessedEvent( ) function indicating a processed event, the widget service provider 10 collects widget related information corresponding to the processed event by invoking an UpdateContent( ) function at step 1109. For example, the widget service provider 10 may support access to a webpage and collection of news or weather information. After collection of widget related information, the widget service provider 10 invokes an UpdatedContentData( ) function to send updated content data to the widget controller process 30 at step 1111. The widget controller process 30 invokes an UpdatedContentData( ) function to forward updated content data to the widget viewer application 50 at step 1113.

Upon reception of updated content data, the widget viewer application 50 outputs the same to the widget output region by invoking an UpdateContent( ) function at step 1115. Here, the updated content data, which is produced by the widget service provider 10 and delivered to the widget viewer application 50 through the widget controller process 30, is solely text data. Hence, the widget viewer application 50 may output updated content data on the widget output region according to a preset display format. To this end, the widget viewer application 50 may be designed to have various display options for the widget output region.

Figure 12:
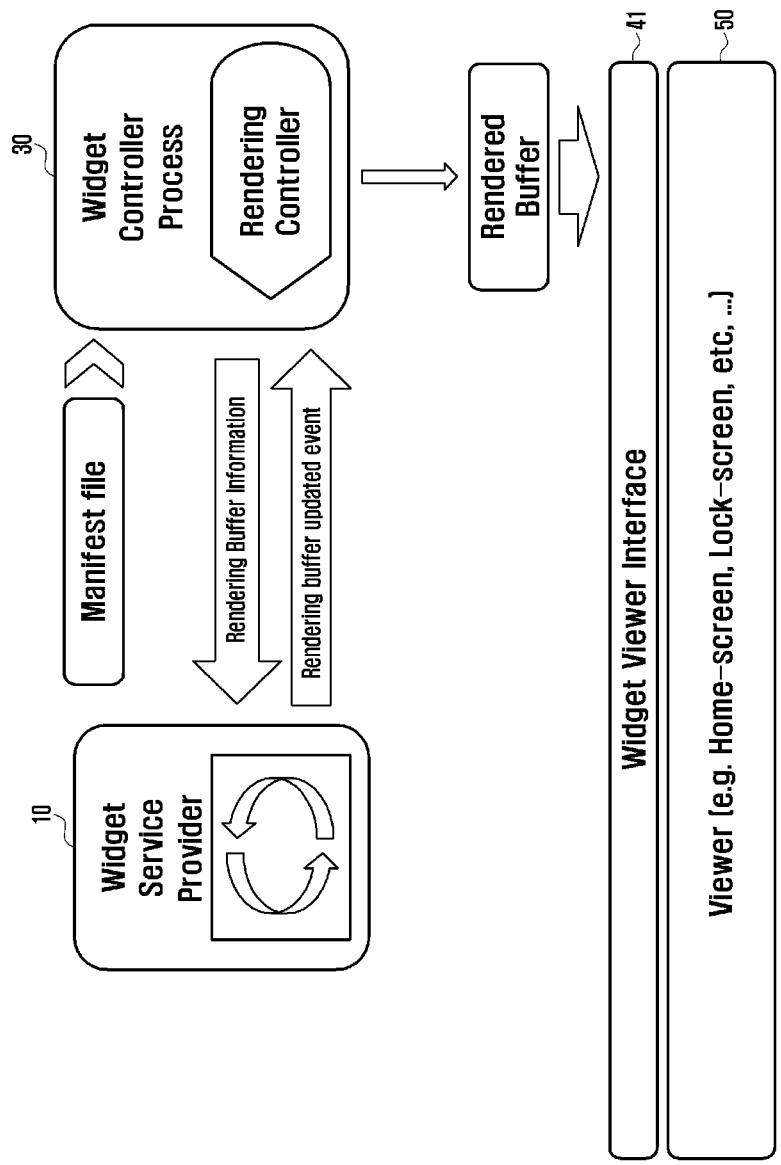
FIG. 12 illustrates a memory-buffer based display in content rendering according to an exemplary embodiment of the present invention.
Figure 13:
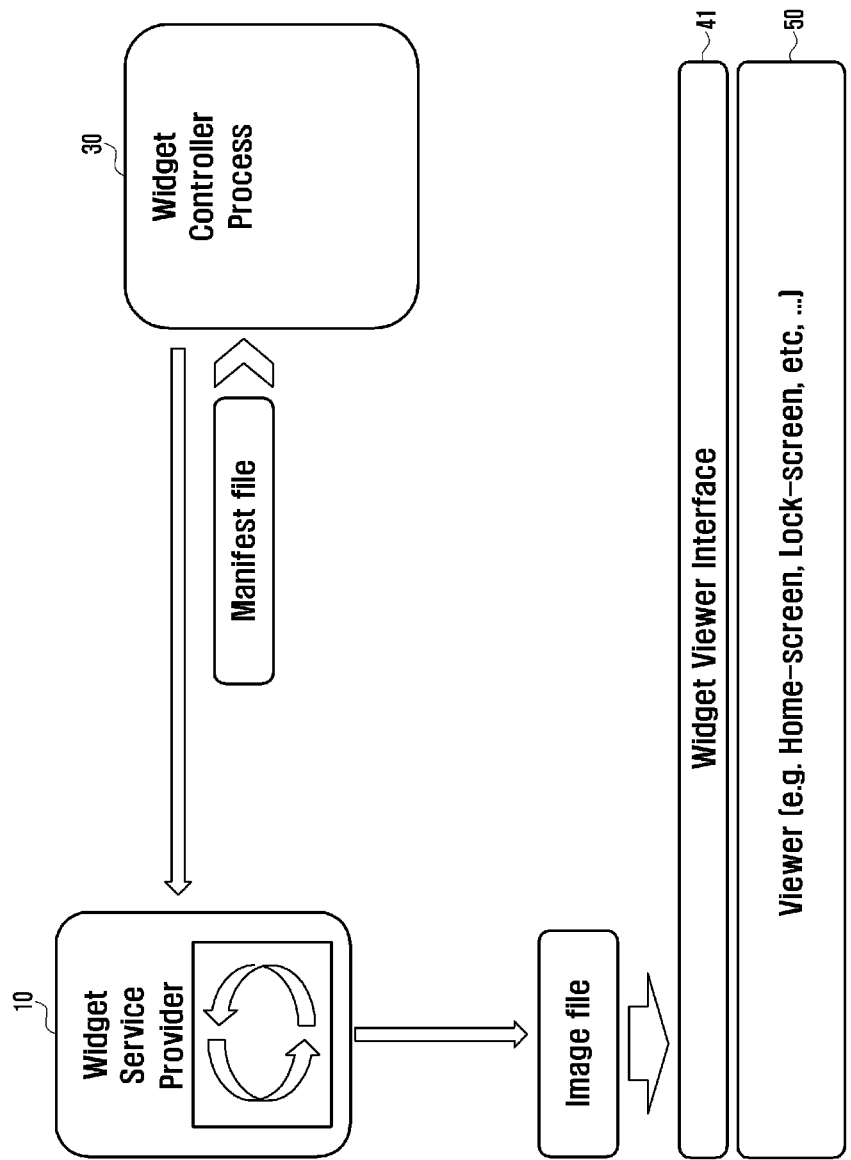
FIG. 13 illustrates an image-file based display in content rendering according to an exemplary embodiment of the present invention.
Figure 14:
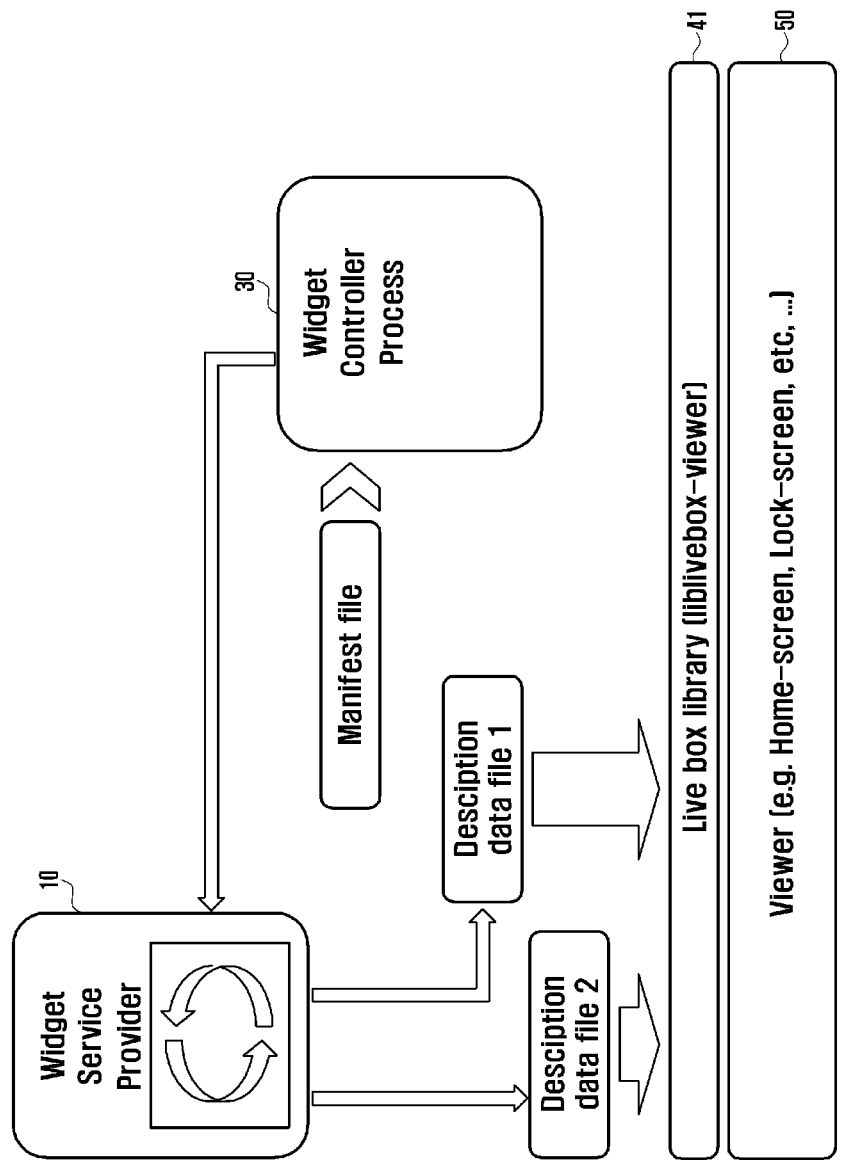
FIG. 14 illustrates a text based display in content rendering according to an exemplary embodiment of the present invention.

FIGS. 12 through 14 illustrate display options for a widget output region according to exemplary embodiments of the present invention. FIG. 12 illustrates a memory-buffer based display in content rendering according to an exemplary embodiment of the present invention.

Referring to FIG. 12, when an input event, such as a touch event, occurs on the widget output region, the widget viewer application 50 sends the input event to the widget controller process 30. The widget viewer application 50 may further provide identification information of a widget associated with the input event.

The widget controller process 30 identifies property information (Manifest file) of the widget based on the received identification information. The widget controller process 30 identifies the display option of the widget from the property information. When the display option indicates memory-buffer based display, the widget controller process 30 prepares a memory buffer using the rendering controller 39, and provides rendering buffer information collected using the provider controller 31 and widget instance manager 33 to a corresponding process and widget in the widget service provider 10.

The widget service provider 10 prepares widget related information and visual effect data by executing the widget according to a request from the widget controller process 30. The widget service provider 10 writes the widget related information and visual effect data in the memory buffer provided by the widget controller process 30. The widget service provider 10 sends a rendering buffer updated event to the widget controller process 30. The widget controller process 30 sends information on the rendered buffer to the widget viewer application 50 through the viewer interface 41.

The widget viewer application 50 outputs widget related information and visual effect data in the memory buffer to the display unit 140. For example, widget related information and visual effect data are output on a screen where the input event occurred, such as the home screen, a lock screen, a menu screen, or a widget screen.

When the identified property information of the widget selected by the input event indicates that the widget is linked with a particular function, the widget controller process 30 may support execution of the function and display of corresponding result data.

FIG. 13 illustrates an image-file based display in content rendering according to an exemplary embodiment of the present invention.

Referring to FIG. 13, the widget controller process 30 may receive an event for updating widget related information or for changing a portion of the widget output region generated according to operation of the terminal device 100 or preset scheduling information. The widget controller process 30 identifies attributes of a widget associated with the event with reference to property information (Manifest file). When the display option indicates image-file based display, the widget controller process 30 notifies this to the widget service provider 10. Here, the widget controller process 30 may send an information update request and image-file based display indication to the widget and corresponding process.

Upon reception of an information update request and image-file based display indication, the widget service provider 10 executes the widget to collect widget related information. At the same time, the widget service provider 10 creates an image file reflecting a visual effect corresponding to selection on the widget output region, and sends the image file to the widget viewer application 50 through the viewer interface 41. In addition, the widget service provider 10 creates an image file reflecting the collected widget related information, and sends the image file to the widget viewer application 50 through the viewer interface 41. Here, the widget service provider 10 may create an image file reflecting both the visual effect and widget related information and send the image file to the widget viewer application 50.

FIG. 14 illustrates a text based display in content rendering according to an exemplary embodiment of the present invention.

Referring to FIG. 14, similarly to the cases described in connection with FIGS. 12 and 13, the widget controller process 30 examines widget property information (Manifest file). When the display option indicates text based display, the widget controller process 30 notifies this to the widget service provider 10. Here, the widget controller process 30 may send an information update request (for widget related information collection or visual effect application) and text based display indication to the widget service provider 10.

Upon reception of an information update request from the widget controller process 30, the widget service provider 10 creates first text information (Description Data 1) describing application of a visual effect to the widget output region and sends the first text information to the widget viewer application 50 through Live box library 56. The widget viewer application 50 may apply a visual effect to the widget output region based on the first text information (Description Data 1) and Live box library 56. Live box library 56 is used to configure image elements constituting the widget output region according to the first text information. The widget viewer application 50 maps image elements configured by Live box library 56 with the first text information and outputs the mapping results on the widget output region.

In addition, the widget service provider 10 collects widget related information. The widget service provider 10 creates second text information (Description Data 2) describing application of widget related information to the widget output region and sends the second text information to the widget viewer application 50 through Live box library 56. The widget viewer application 50 may change the text part of the widget output region together with a visual effect or other variation based on the second text information (Description Data 2) and Live box library 56.

For example, in a state where multiple pieces of weather information of different geographical areas are output on the widget output region, the widget viewer application 50 may receive text information corresponding to one piece of weather information from the widget service provider 10 and output the text information on the widget output region so that only one piece of weather information is visible. Here, the one piece of weather information may be displayed in an enlarged or reduced form to fit within the widget output region.

In addition, the terminal device 100 may support script-based content update in content rendering. For script-based content update, the widget controller process 30 creates a content area and writes content data in the content area using a script engine. The widget controller process 30 adds content data received from the widget service provider 10 to the content area and notifies the widget viewer application 50 of the content area. In the case of script-based content update, the widget package information manager 35 provides a script file specifying the content area layout. The widget controller process 30 may load the script file to configure the content layout when generating content. To control the layout, the corresponding widget running in the widget service provider 10 provides a description file to the widget controller process 30. The widget controller process 30 parses the description file, performs content update accordingly, and sends an update event to the widget viewer application 50, which then performs screen update.

FIG. 15 illustrates a result of monitoring process behaviors in a user function operation according to an exemplary embodiment of the present invention.

Referring to FIG. 15, the terminal device 100 may execute a widget with a Process IDentifier (PID) 2857 and a widget with a PID 3602. For each widget, the terminal device 100 sustains Time To Live (TTL) to manage the lifecycle of the widget. TTL is given by property information of the widget (Manifest file). Here, the widget with a PID 2857 having TTL set to 0.0000 may have an unspecified lifecycle. For example, the widget with a PID 2857 is a widget that is loaded in the first memory 161 and runs continuously.

The widget with a PID 3602 has TTL of 22 seconds initially. With continued execution, the TTL value of the widget with a PID 3602 is decreased. When the TTL value becomes zero (timer expiration), the control unit 160 may remove the widget with a PID 3602 from the first memory 161. At this time, execution of the widget with a PID 3602 is temporarily suspended. To terminate execution of a widget, the control unit 160 may set a PID of the widget to −1. The control unit 160 may use a preset a PID value to represent temporary suspension of a widget due to TTL expiration. Upon TTL expiration, the state of the widget with a PID 3602 is changed from "Resumed" to "terminated". As described above, a widget supporting a user function may be loaded on the first memory 161 only when it is executed to collect relevant information. Hence, it is possible to minimize routines actually loaded on the first memory 161, reducing power consumed by the first memory 161. It is also possible to load actually needed routines only on the first memory 161, increasing memory usage efficiency.

FIGS. 16A through 16E are screen representations depicting widget execution in a user function operation according to an exemplary embodiment of the present invention. In the following description, a widget function is regarded as a user function, and variations of the widget output region are depicted using a widget function for voice recording.

Figure 16A:
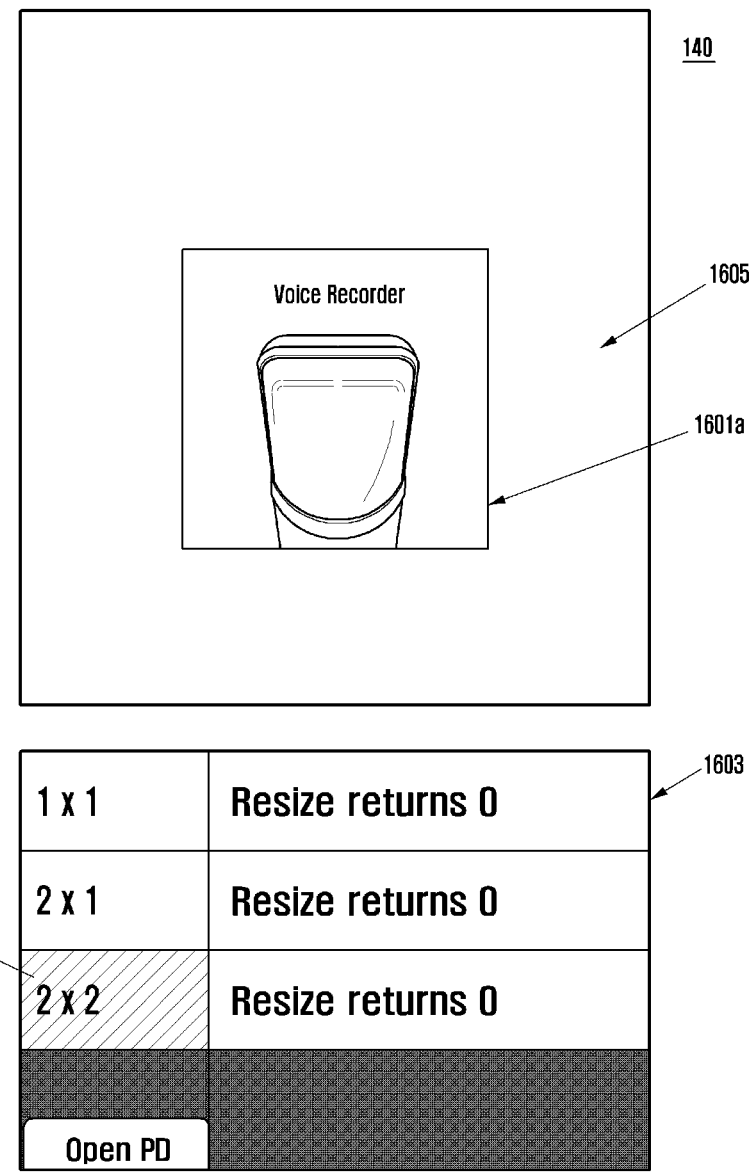

Referring to FIG. 16A, in response to a request for widget addition, the terminal device 100 outputs a first widget output region 1601*a* on the display unit 140. Together with the first widget output region 1601*a*, a background region 1605 may be output on the display unit 140. The background region 1605 may be provided by default by the widget viewer application 50, or provided according to execution of a widget loaded on the widget service provider 10. The widget may include a routine for image output, a routine for audio path control, and a routine for audio signal collection and recording.

The terminal device 100 may maintain an information management region 1603 to manage event histories and widget information output states for controlling the widget function execution. The information management region 1603 may be output on the display unit 140 or maintained internally without being displayed. The information management region 1603 may provide size information of the widget output region and history information of widget function executions.

The information management region 1603 may be used to maintain size options of the first widget output region 1601*a*. In FIG. 16A, the information management region 1603 indicates that the first widget output region 1601*a* is resized by 1×1, 2×1 and 2×2 and the current size 1606*a* is 2×2. To change the widget output region, the user may touch a portion of the widget output region on the display unit 140 and generate a touch event for resizing the widget output region. The user may also use a separate input means, such as a mouse or physical key, to issue a request for resizing the widget output region.

As described before, the terminal device 100 may manage history information of widget executions and provide information on current display states. To this end, the terminal device 100 may output the information management region 1603 on the display unit 140 or provide the same to a separate external device.

To output the first widget output region 1601*a*, the control unit 160 executes the widget viewer application 50. To support the voice recording function, the control unit 160 executes the widget controller process 30 and the widget service provider 10.

Figure 16B:
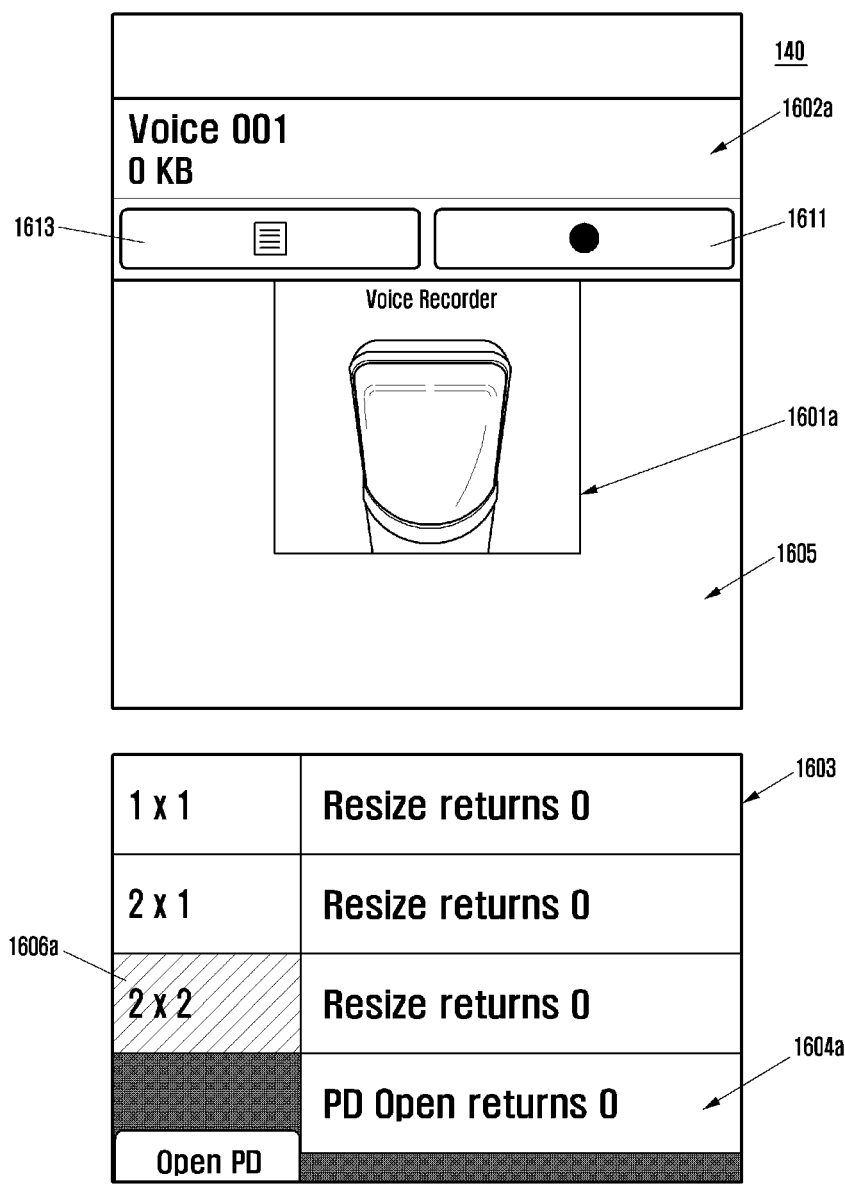

Referring to FIG. 16B, in response to an input event, the control unit 160 may output a first widget additional view 1602*a* on the display unit 140. To invoke the first widget additional view 1602*a*, the user may generate a preset input event by selecting a menu item or touching a portion of the first widget output region 1601*a*. Thereafter, the control unit 160 may identify the input event and control display of the first widget additional view 1602*a* with reference to property information of the corresponding widget. The widget viewer application 50 may determine the display position of the first widget additional view 1602*a*. Here, the widget viewer application 50 may determine the display position of the first widget additional view 1602*a* differently according to arrangement of the first widget output region 1601*a*, for example, portrait or landscape orientation. The widget viewer application 50 may also adjust at least one of the size and the position of the first widget additional view 1602*a* according to the size of the first widget output region 1601*a*.

The background region 1605 may be adjusted on the display unit 140 so that it acts as a background for both the first widget output region 1601*a* and the first widget additional view 1602*a*. As described before, the background region 1605 may be provided by the widget viewer application 50 or provided by the widget service provider 10 according to widget execution. The information management region 1603 may be used to provide current size information of the first widget output region 1601*a* being currently displayed.

The information management region 1603 may be updated according to a display request for the first widget additional view 1602*a*. For example, an entry 1604*a* for the first widget additional view 1602*a* may be added to the history list of the information management region 1603. For the first widget additional view 1602*a*, functional routines supporting the corresponding widget and the first widget additional view 1602*a* may be loaded on the first memory 161. As routines supporting the widget are already loaded on the first memory 161, routines supporting the first widget additional view 1602*a* may be loaded additionally. The routines supporting the first widget additional view 1602*a* may include a routine for outputting a virtual "record" button 1611 and voice recording, a routine for outputting a virtual "memo" button 1613 and memo writing, and a routine for title and recording related information processing. The information management region 1603 exhibits an entry 1606*a* for the size option of the first widget output region 1601*a* being currently displayed. Here, the information management region 1603 may be designed to further exhibit an entry indicating the size option of the first widget additional view 1602*a*.

Figure 16C:
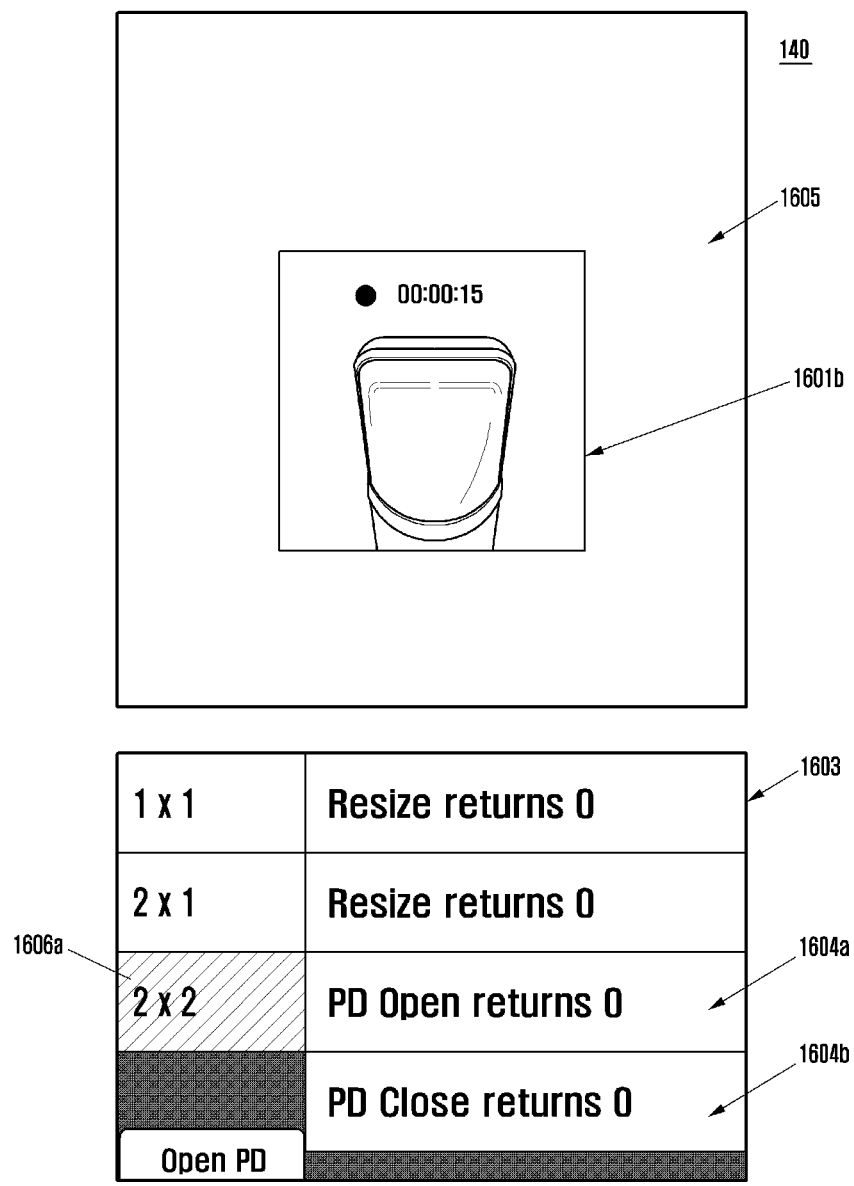

Referring to FIG. 16C, in response to a recording request issued by selecting the virtual "record" button 1611 of FIG. 16B, the control unit 160 may output a second widget output region 1601*b* as a voice recording screen on the display unit 140. The background region 1605 may also be output on the display unit 140. The second widget output region 1601*b* may be created using a new image file or created by adding new information elements to the first widget output region 1601*a*. To this end, the widget service provider 10 supports update of the second widget output region 1601*b*. The widget service provider 10 may execute the corresponding widget to continuously collect audio signals through the microphone and temporarily store the same. While the second widget output region 1601*b* is being updated by the widget viewer application 50, the widget service provider 10 may perform image and text information processing to change time values in real time for measuring time.

Re-selection of the virtual "record" button 1611 may automatically stop display of the first widget additional view 1602*a*. To this end, the first widget additional view 1602*a* may be designed to automatically disappear from the display unit 140 when the virtual "record" button 1611 is selected. With removal of the first widget additional view 1602*a*, the information management region 1603 may include an entry 1604*a* for first widget additional view addition and an entry 1604*b* for first widget additional view removal as history items. The information management region 1603 may further include an entry 1606*a* for the size option of the second widget output region 1601*b* being currently displayed. When the first widget additional view 1602*a* is removed from the display unit 140, the widget service provider 10 may remove routines related to the first widget additional view 1602*a* from the first memory 161.

When an input event for requesting an additional view is generated during voice recording, the control unit 160 may control the display unit 140 to output a second widget additional view 1602*b* as shown in FIG. 16D. Here, the second widget additional view 1602*b* may be a variant of the first widget additional view 1602*a* or be a quite different one from the first widget additional view 1602*a*. The second widget additional view 1602*b* may be invoked by an input event identical to or different from that invoking the first widget additional view 1602*a*. In a state where the second widget output region 1601*b* is displayed, when an additional view request is issued, the control unit 160 may control the display unit 140 to output the second widget additional view 1602*b*. In a state where the first widget output region 1601*a* is displayed, when an additional view request is issued, the control unit 160 may control the display unit 140 to output the first widget additional view 1602*a*.

Referring to FIG. 16D, the second widget additional view 1602*b* includes virtual buttons different from those included in the first widget additional view 1602*a*. For example, to control voice recording, the second widget additional view 1602*b* may include a virtual addition button 1621, a virtual "stop" button 1622, a virtual "pause" button 1623, and a virtual "end" button 1624.

The information management region 1603 may include an entry 1604*a* for first widget additional view addition, an entry 1604*b* for first widget additional view removal and an entry 1604*c* for second widget additional view addition according to invocation histories for widget additional views. The information management region 1603 may further include size options, such as the current first size entry 1606*a*.

Figure 16E:
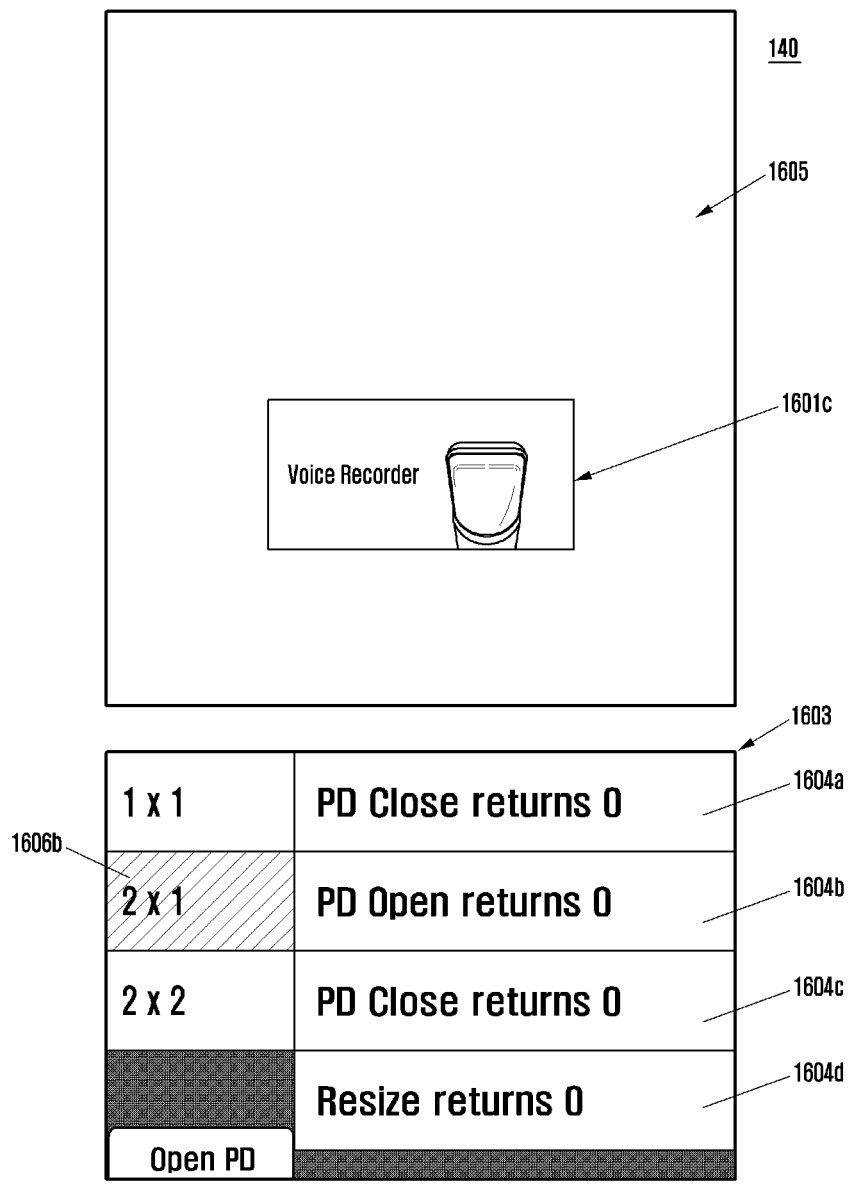

Referring to FIG. 16E, resizing of the widget output region is illustrated. When the virtual "stop" button 1622 is selected in FIG. 16D, the control unit 160 may stop voice recording and control the display unit 140 to output a default screen related to voice recording. For example, the display unit 140 may output the first widget output region of size 2×2 together with the background region 1605. Thereafter, when an input event for widget output region modification is received, the control unit 160 may change the size of the widget output region. In FIG. 16E, a third widget output region 1601*c* of size 2×1 is presented.

In the information management region 1603, the second entry 1606*b* for the size option may be highlighted according to a size change of the widget output region. The information management region 1603 may include an entry 1604*a* for first widget additional view addition, an entry 1604*b* for first widget additional view removal, an entry 1604*c* for second widget additional view addition and an entry 1604*d* for second widget additional view removal according to invocation histories for widget additional views. As described before, the information management region 1603 may be not output on the display unit 140, and may be presented to a separate external device or on a separate widget management screen. In this case, the first size entry 1606*a* and the second size entry 1606*b* with a highlight may be not presented on the current screen and may be output on a separate screen displaying the information management region 1603.

Figure 17A:
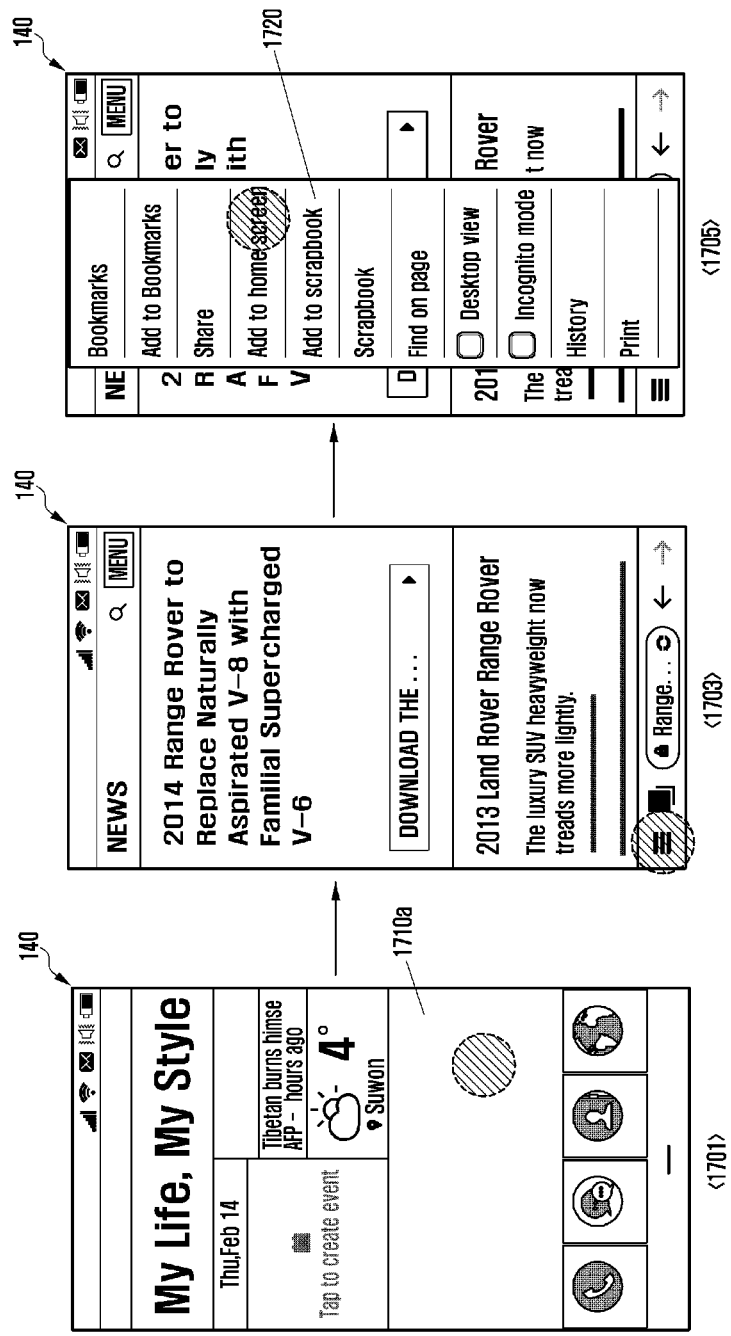
FIGS. 17A through 17C are screen representations depicting widget creation and application in a user function operation according to an exemplary embodiment of the present invention.
Figure 17B:
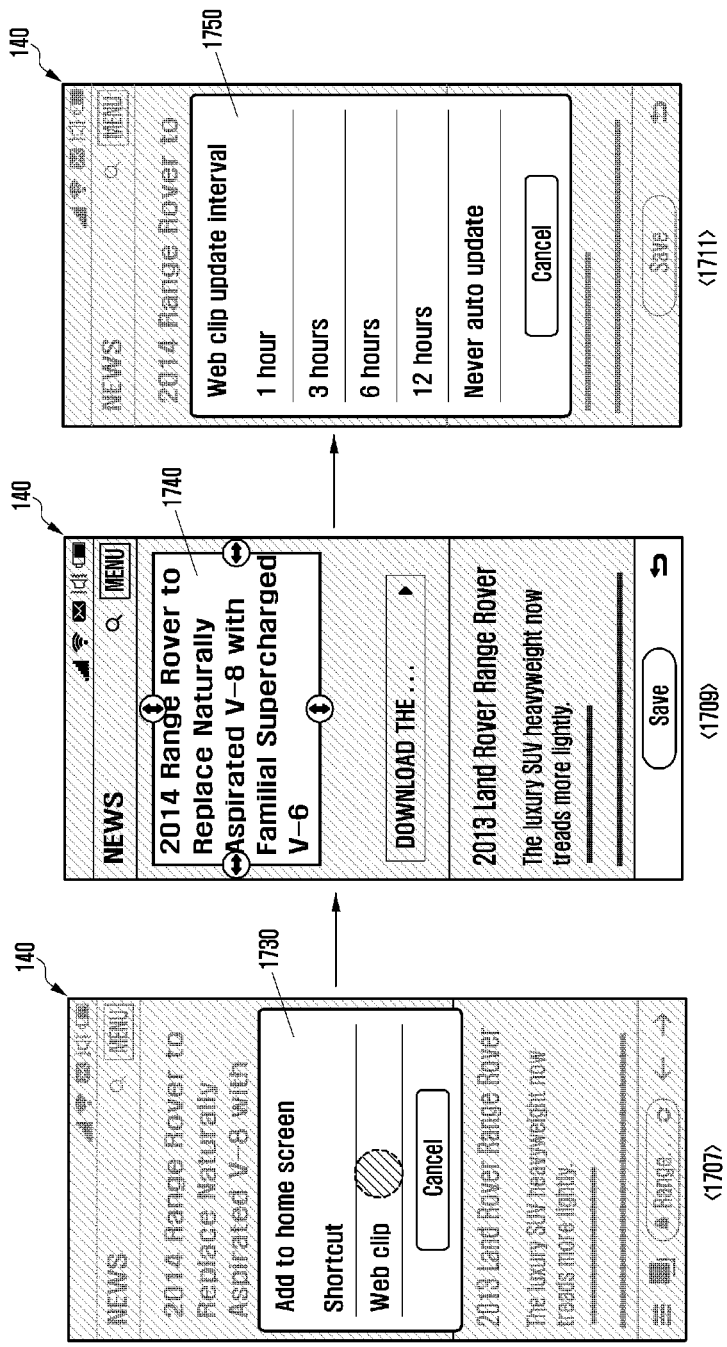
Figure 17C:
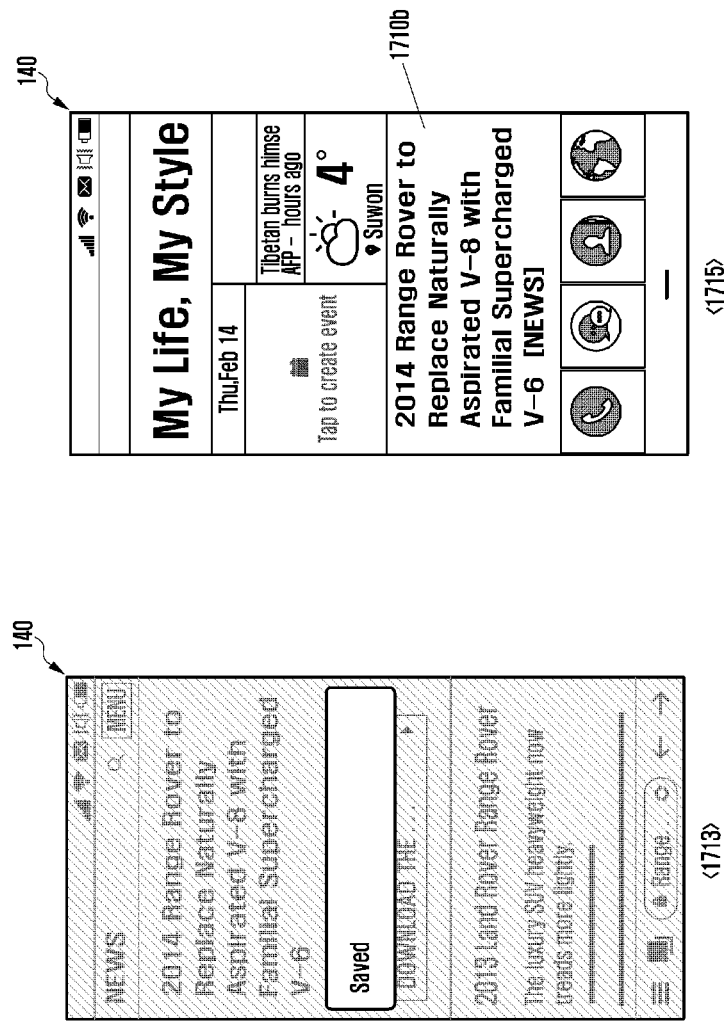

FIGS. 17A through 17C are screen representations depicting widget creation and application in a user function operation according to an exemplary embodiment of the present invention.

Referring to FIGS. 17A through 17C, the terminal device 100 may output a screen, such as an idle screen, a home screen, or a widget screen, on the display unit 140 to wait for user function operation as indicated by reference numeral 1701 (in the following description, such a screen is referred to as the home screen). The home screen may include various regions, such as a region for a title like "My Life, My Style", a region for day information, and a region for weather information. The home screen may include a virtual soft key at a lower end portion. The home screen may also include a first function addition region 1710a whose role is not yet indicated.

When the first function addition region 1710a is selected, the terminal device 100 may output a user function screen as indicated by reference numeral 1703. For example, when the first function addition region 1710a is selected, the terminal device 100 may output a list of menu items. Upon selection of a menu item associated with a website from the list, the terminal device 100 may output a web access screen for the website as indicated by reference numeral 1703.

When a menu item associated with the first function addition region 1710a is selected, the terminal device 100 may output a menu list region 1720 at an area of the screen as indicated by reference numeral 1705. When an entry labeled "Add to home screen" (for adding a function to the home screen) is selected from the menu list region 1720, the terminal device 100 may output a submenu region 1730 containing submenu items of the selected entry as indicated by reference numeral 1707. Here, for example, the submenu region 1730 of the entry labeled "Add to home screen" includes an entry labeled "shortcut" and an entry labeled "web clip". When the entry labeled "web clip" is selected, the terminal device 100 may output a schedule selection region 1740 for cropping a portion of a webpage to be used as a web clip as indicated by reference numeral 1709. Here, the size of the schedule selection region 1740 may be changed according to touch events.

Upon determining the schedule selection region 1740, the terminal device 100 may output an interval selection region 1750 for selecting a widget function execution cycle at a region of the display unit 140 as indicated by reference numeral 1711. Here, for example, the interval selection region 1750 provides update interval options of 1, 3, 6 and 12 hours and a no-automatic update option. More update interval options may be provided on a minutely, daily or monthly basis according to design.

Upon selection of an interval option from the interval selection region 1750, the terminal device 100 may add a "web clip" function to the home screen and output a notification "saved" on the screen as indicated by reference numeral 1713. Thereafter, the terminal device 100 displays the home screen on the display unit 140 as indicated by reference numeral 1715. The updated home screen includes a function region 1710b to output a web clip extracted from a webpage specified through the schedule selection region 1740.

In the control unit 160, the widget viewer application 50 composes a widget output region to be output on the function region 1710b. The widget controller process 30 may manage the widget output region as context. The widget controller process 30 may load functional routines of the corresponding widget on the first memory 161 to collect widget related information according to the selected widget execution cycle.

When the widget execution cycle is reached, the widget service provider 10 loads the widget and corresponding process on the first memory 161 to execute the widget, which accesses the website indicated by reference numeral 1713 and collects information from the specified portion of a webpage of the website as widget related information.

The lifecycle of the widget output on the function region 1710b of the home screen may be set to a default value when no separate value is given. For example, the lifecycle of the widget output on the function region 1710b may be set to 30 seconds. Thereafter, after 30 seconds from update of information output on the function region 1710b, the widget or process may be removed from the first memory 161.

Figure 18:
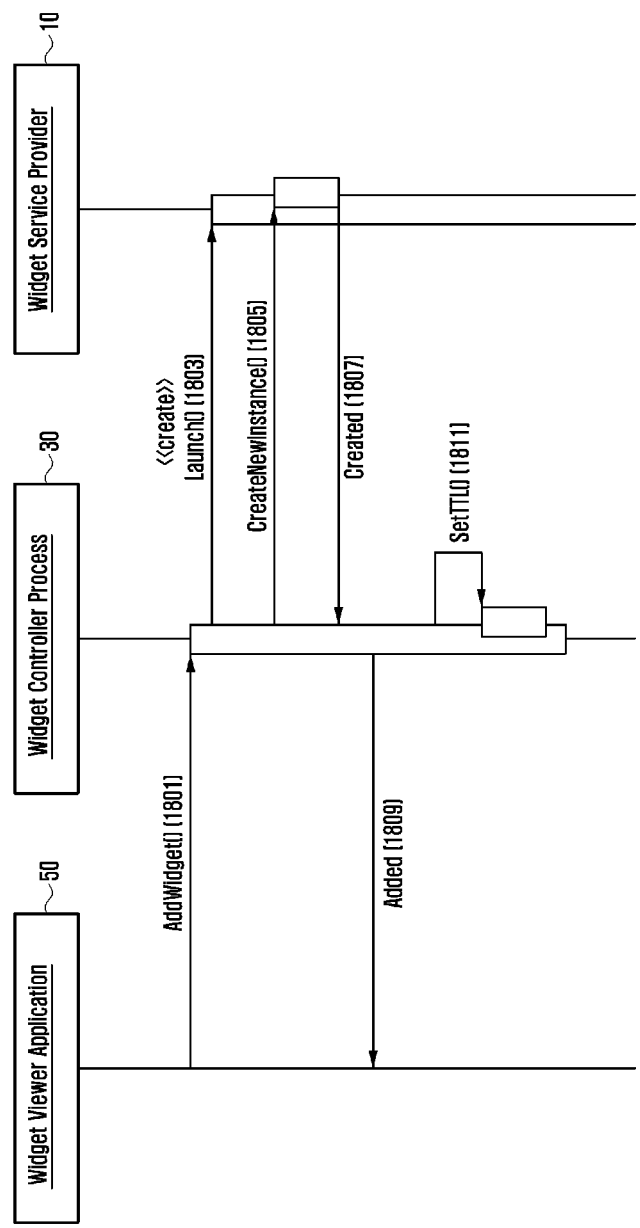
Figure 19:
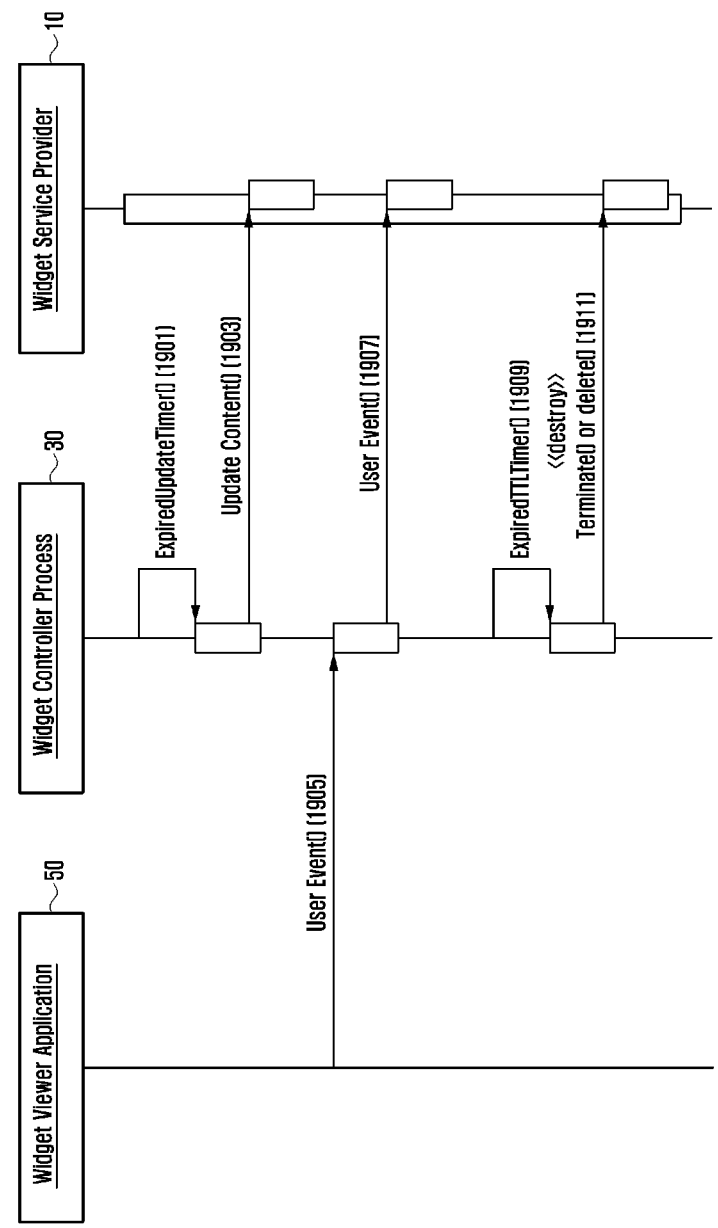

FIGS. 18 through 20 are sequence diagrams illustrating a process and a widget lifecycle management in a user function operation according to an exemplary embodiment of the present invention.

Referring to FIG. 18, in response to an event for widget addition, the widget viewer application 50 invokes an AddWidget( ) function to send a widget addition request to the widget controller process 30 at step 1801. Upon reception of a widget addition request, the widget controller process 30 invokes a Launch( ) function to send a request for loading a process on the first memory 161 to the widget service provider 10 at step 1803. Thereafter, the widget controller process 30 invokes a CreateNewInstance( ) function to send a request for loading a widget on the process to the widget service provider 10 at step 1805.

Upon reception of a request for loading a widget, the widget service provider 10 loads the requested widget on the corresponding process. The widget service provider 10 sends a widget loading indication (Created) to the widget controller process 30 at step 1807. The widget controller process 30 sends a widget addition indication (Added) to the widget viewer application 50 at step 1809.

The widget controller process 30 invokes a SetTTL( ) function to operate a timer for managing the lifecycle of the corresponding widget at step 1811.

Referring to FIG. 19, before expiration of the timer, upon detection of an event for information update or upon arrival of the widget execution cycle, the widget controller process 30 invokes an ExpiredUpdateTimer( ) function to extend the duration of the timer or to reset the timer at step 1901. The widget controller process 30 invokes an UpdateContent( ) function to send a request for collecting widget related information to the widget service provider 10 at step 1903. Thereafter, as described before, the widget service provider 10 collects widget related information, and may deliver the collected widget related information to the widget viewer application 50 via the widget controller process 30 or write the same in a memory buffer according to content display options.

When a user event for a widget function execution is received from the user, the widget viewer application 50 invokes a UserEvent( ) function to send the user event to the widget controller process 30 at step 1905. The widget controller process 30 invokes a UserEvent( ) function to forward the user event to the widget service provider 10 at step 1907. Upon reception of a user event, the widget service provider 10 collects widget related information and performs information update according to the user event. Here, in response to the user event, the widget controller process 30 may extend the lifecycle of the widget or reset the timer thereof.

The widget controller process 30 may detect expiration of the timer set for widget lifecycle management by receiving an indication from an ExpiredTTLTimer( ) function at step 1909. Thereafter, the widget controller process 30 invokes a Terminate( ) or delete( ) function to send a request for widget deletion to the widget service provider 10 at step 1911. Upon reception of a request for widget deletion, the widget service provider 10 removes the requested widget from the first memory 161. When the requested widget is the last one loaded on a corresponding process, the widget service provider 10 may also terminate the process.

Referring to FIG. 20, when the widget viewer application 50 receives a user event requesting activation of a widget having been removed from the first memory 161, it invokes a UserEvent( ) function to send the user event to the widget controller process 30 at step 2001. The widget controller process 30 invokes a Launch( ) function to send a request for loading the process to load the widget to the widget service provider 10 at step 2003. Here, when the widget is of plug-in type, as the corresponding process may be already loaded, step 2003 may be skipped. The widget controller process 30 invokes a UserEvent( ) function to forward the user event to the widget service provider 10 at step 2005. The widget service provider 10 may load the widget on the process and apply the user event to the widget. The widget controller process 30 may start a timer to manage the lifecycle of the widget.

The widget controller process 30 may detect expiration of the timer set for widget lifecycle management at step 2007. Thereafter, the widget controller process 30 invokes a Delete( ) or Terminate( ) function to send a request for widget deletion or process termination to the widget service provider 10 at step 2009. Upon reception of a request for widget deletion or process termination, the widget service provider 10 may remove the widget from the first memory 161 or terminate the corresponding process.

The widget controller process 30 may detect arrival of the widget execution cycle according to a notification from an ExpiredUpdateTimer( ) function at step 2011. Thereafter, the widget controller process 30 invokes a Launch( ) function to send a request for loading the process to load the widget to the widget service provider 10 at step 2013. Here, the widget controller process 30 may start a timer for widget lifecycle management. The widget controller process 30 invokes an UpdateContent( ) function to send a request for information update to the widget service provider 10 at step 2015. The widget service provider 10 executes the widget to collect widget related information according to the information update request. Here, the widget service provider 10 may produce a visual effect to be applied to the widget output region.

Thereafter, the widget controller process 30 may detect expiration of the timer at step 2017. Thereafter, the widget controller process 30 invokes a Delete( ) or Terminate( ) function to send a request for widget deletion or process termination to the widget service provider 10 at step 2019. Upon reception of the request, the widget service provider 10 may remove the widget or process from the first memory 161.

As described above, the user function operation method of exemplary embodiments of the present invention enables a terminal device to support memory-resident user functions in such a manner that applications are executed on a regular operating system without use of a separate runtime environment. An exemplary embodiment of the present invention provides an interface based on the widget service provider so as to bind software components developed in different environments. For example, an exemplary embodiment of the present invention may support a web-based widget developed in a web environment. In addition, the present invention provides widget interfaces that can be separately redefined and implemented according to platforms. In other words, the framework proposed by the present invention enables easy development of user function programs, such as widgets that are highly portable between various systems.

The terminal device may further include various components according to design. For example, when the terminal device is a communication terminal, it may further include a short-range communication module for short-range communication, a data communication interface based on wired and wireless communication, an Internet communication module for Internet access, and a digital broadcast reception module for playing digital broadcasts. With the trend towards digital convergence, it should be apparent to those skilled in the art that the terminal device may further include a unit comparable to the above-described units, and one unit of the terminal device may be removed or replaced with another unit.

The terminal device of the present invention may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like a Motion Pictures Expert Group (MPEG-1 or MPEG-2) Audio Layer 3 (MP3) player, a portable game console, a smartphone, a laptop computer, a handheld computer, or the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A user function operation method for an electronic device, the method comprising:
   executing a user function according to at least one of a selection event and a preset execution cycle by loading program data realizing the user function on a first memory, the program data being loaded on the first memory from a third memory;
   initiating a timer after the user function is executed;
   displaying information collected during the execution of the user function, the information collected during the execution of the user function being stored in a second memory before the information collected during the execution of the user function is displayed;
   removing, upon expiration of the timer, the program data from the first memory; and
   storing, upon removing the program data from the first memory, the information collected during the execution of the user function and a state of the user function in the third memory,
   wherein the information stored in the second memory is continuously stored in the second memory upon removing the program data from the first memory,
   wherein the executing of the user function comprises:
      examining property information of the user function;
      loading, when the user function is of plug-in type, routines supporting the user function on an existing loaded process supporting a plug-in type user function;
      determining a load level of the existing loaded process;
      cloning, when the load level of the existing loaded process exceeds a threshold value, the existing loaded process; and
      loading routines supporting the user function on the cloned process; and
   wherein the method further comprising one of:
      extending, upon generation of the selection event or arrival of the preset execution cycle before expiration of the timer, a duration of the timer; or
      resetting, upon generation of the selection event or arrival of the preset execution cycle before expiration of the timer, the timer.

2. The method of claim 1, wherein the program data realizing the user function is at least one of a process developed using a programming language or a widget to be loaded on the process.

3. The method of claim 1, wherein the executing of the user function comprises:
 loading a process on the first memory in consideration of at least one of a process type function or the plug-in type function; and
 loading routines supporting the user function on the process.

4. An electronic device supporting a user function operation, the electronic device comprising:
 a first memory;
 a display;
 a second memory;
 a third memory; and
 at least one processor configured to:
  load program data realizing a user function on the first memory from the third memory,
  execute the user function based on at least one of a selection event or a preset execution cycle after the program data is loaded on the first memory,
  initiate a timer after the user function is executed,
  control the display to display information collected during the execution of the user function, the information collected during the user function being stored in the second memory before the information collected during the execution of the user function is displayed,
  upon expiration of the timer, delete the loaded program data from the first memory, and
  upon removal of the program data from the first memory, store the information collected during the execution of the user function and a state of the user function in the third memory,
 wherein the information stored in the second memory is continuously stored in the second memory upon removing the program data from the first memory,
 wherein the at least one processor is further configured to:
  examine property information of the user function,
  load, when the user function is of plug-in type, routines supporting the user function on an existing loaded process supporting a plug-in type user function,
  determine a load level of the existing loaded process,
  clone, when the load level of the existing loaded process exceeds a threshold value, the existing loaded process, and
  load routines supporting the user function on the cloned process, and
 wherein, upon generation of the selection event or arrival of the preset execution cycle before expiration of the timer, the at least one processor is further configured to extend a duration of the timer or resets the timer.

5. The electronic device of claim 4, wherein the program data realizing the user function is at least one of a process developed using a programming language or a widget to be loaded on the process.

6. The electronic device of claim 4, wherein the at least one processor is further configured to:
 load a process on the first memory in consideration of at least one of a process type function or the plug-in type function, and
 load routines supporting the user function on the process.

7. An electronic device supporting a user function operation, the electronic device comprising:
 a first memory;
 a second memory;
 a third memory;
 a display configured to display a widget output region for widget execution; and
 at least one processor configured to:
  execute a widget viewer application, the widget viewer application including instructions for at least one of:
   receiving an input event indicating arrival of an execution cycle of a widget,
   requesting execution of the widget, and
   displaying widget information,
  execute a widget service provider, the widget service provider including instructions for:
   loading a process, and
   loading, to the first memory, the widget on the process to execute the widget, and
  execute a widget controller process, the widget controller process residing between the widget service provider and the widget viewer application and including instructions for:
   controlling widget execution, and
   storing widget related information to the second memory,
 wherein the widget controller process starts a timer having a preset lifetime when the execution cycle is reached and unloads the widget from the first memory when the timer expires,
 wherein the widget related information and a state of the widget are stored in the third memory when the widget is unloaded from the first memory,
 wherein the widget related information stored in the second memory is continuously stored in the second memory when the widget is unloaded from the first memory,
 wherein the at least one processor is further configured to:
  examine property information of the widget,
  load, when the widget is of plug-in type, routines supporting the widget on an existing loaded process supporting a plug-in type widget,
  determine a load level of the existing loaded process,
  clone, when the load level of the existing loaded process exceeds a threshold value, the existing loaded process, and
  load routines supporting the widget on the cloned process
 wherein the widget service provider loads, in response to a request for widget view addition on the widget output region, a view addition routine on the first memory for execution, and
 wherein the widget viewer application outputs a new view created by the view addition routine together with the widget output region on the display.

8. The electronic device of claim 7, wherein, when the unloaded widget is a last one loaded on the process, the widget controller process terminates the process.

9. The electronic device of claim 7,
 wherein the widget viewer application sends, upon generation of an input event requesting execution of a widget, the input event to the widget controller process, and
 wherein the widget controller process forwards the input event to the widget service provider to control process loading and widget loading and starts a timer used to unload the widget.

10. The electronic device of claim 7,
wherein the second memory is a memory buffer,
wherein the widget controller process allocates the memory buffer for widget related information output,
wherein the widget service provider writes widget related information generated during widget execution in the memory buffer, and
wherein the widget viewer application outputs information written in the memory buffer to a display after the information is written in the memory buffer.

11. The electronic device of claim 7,
wherein the widget controller process provides the property information of a widget to the widget service provider, and
wherein the widget service provider generates widget related information during widget execution according to the property information and provides the widget related information as an image file to the widget viewer application.

12. The electronic device of claim 7,
wherein the widget controller process provides the property information of a widget to the widget service provider,
wherein the widget service provider generates widget related information during widget execution according to the property information and provides the widget related information as text data to the widget viewer application, and
wherein the widget viewer application controls information output based on the text data and predefined libraries.

* * * * *